US012669454B2

(12) United States Patent
Capua et al.

(10) Patent No.: US 12,669,454 B2
(45) Date of Patent: Jun. 30, 2026

(54) DEVICES, SYSTEMS, AND METHODS FOR TESTING SAMPLES IN TEMPORALLY MODULATED MAGNETIC FIELDS

(71) Applicant: YISSUM RESEARCH DEVELOPMENT COMPANY OF THE HEBREW UNIVERSITY OF JERUSALEM LTD., Jerusalem (IL)

(72) Inventors: Amir Capua, Jerusalem (IL); Nirel Bernstein, Geva Binyamin (IL); Maayan Korcia, Modi'in (IL); Shimon Eliav, Tzur Hadassa (IL); Ma'yan Meron, Jerusalem (IL); Tal David, Pardes Hanna (IL); Amit Rothschild, Modiin (IL)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 230 days.

(21) Appl. No.: 18/756,171

(22) Filed: Jun. 27, 2024

(65) Prior Publication Data

US 2024/0353359 A1    Oct. 24, 2024

Related U.S. Application Data

(63) Continuation of application No. PCT/IL2023/050299, filed on Mar. 21, 2023.
(Continued)

(51) Int. Cl.
*G01N 24/10*    (2006.01)

(52) U.S. Cl.
CPC .................................. *G01N 24/10* (2013.01)

(58) Field of Classification Search
CPC ........ G01R 33/60; G01N 24/10; H01F 7/0273
See application file for complete search history.

(56) References Cited

U.S. PATENT DOCUMENTS 3,681,602 A * 8/1972 Teale ...................... G03G 15/16
                                                         250/353
4,455,527 A * 6/1984 Singer .................... G01R 33/60
                                                         324/318
(Continued)

FOREIGN PATENT DOCUMENTS

CN        101789728 A      7/2010

OTHER PUBLICATIONS

D. Go, D. Jo, C. Kim, and H.-W. Lee, "Intrinsic Spin and Orbital Hall Effects from Orbital Texture", Physical Review Letters 121, 086602 (2018). DOI:https://doi.org/10.1103/PhysRevLett.121.086602.
(Continued)

*Primary Examiner* — Eman A Alkafawi
*Assistant Examiner* — Suresh K Rajaputra
(74) *Attorney, Agent, or Firm* — The Roy Gross Law Firm, LLC; Roy D. Gross

(57)            ABSTRACT

Disclosed herein is a system for magnetic testing of samples. The system includes: (i) a magnetic field generator configured to, by rotating a magnet(s), which is permanent, produce a temporally modulated magnetic field over a region whereat a sample is positioned; (ii) a waveguide positioned adjacently to the sample; (iii) a first sensor configured to obtain a first signal by directly and/or indirectly measuring a modulation rate of the produced magnetic field; (iv) an electromagnetic signal generator coupled to a first end of the waveguide; (v) a second sensor coupled to a second end of the waveguide and configured to obtain a measured signal by measuring a power of an electromagnetic signal transmitted through the waveguide; and (vi) a heterodyne-based
(Continued)

demodulator communicatively associated with the first and second sensors and configured to use a reference signal, constituted by or obtained from the first signal, to demodulate the measured signal.

20 Claims, 22 Drawing Sheets

Related U.S. Application Data

(60) Provisional application No. 63/269,734, filed on Mar. 22, 2022.

(56) References Cited

U.S. PATENT DOCUMENTS

| | | | | |
|---|---|---|---|---|
| 5,302,898 A | * | 4/1994 | Pethig | G01R 33/60 |
| | | | | 324/300 |
| 2014/0028306 A1 | * | 1/2014 | Gokmen | F04D 11/00 |
| | | | | 324/251 |

OTHER PUBLICATIONS

D. Jo, D. Go, and H.-W. Lee, "Gigantic intrinsic orbital Hall effects in weakly spinorbit coupled metals", Physical Review B 98, 214405 (2018). https://doi.org/10.1103/PhysRevB.98.214405.

J. Sinova, D. Culcer, Q. Niu, N. A. Sinitsyn, T. Jungwirth, and A. H. MacDonald, "Universal Intrinsic Spin Hall Effect", Physical Review Letters 92, 126603 (2004). DOI:https://doi.org/10.1103/PhysRevLett.92.126603.

H. L. Wang, C. H. Du, Y. Pu, R. Adur, P .C. Hammel, and F. Y. Yang, "Scaling of Spin Hall Angle in 3d, 4d, and 5d Metals from Y3Fe5O12/Metal Spin Pumping", Physical Review Letters 112, 197201 (2014). DOI:https://doi.org/10.1103/PhysRevLett. 112. 197201.

L. Liu, T. Moriyama, D. C. Ralph, and R. A. Buhrman, "Spin-Torque Ferromagnetic Resonance Induced by the Spin Hall Effect", Physical Review Letters 106, 036601 (2011). DOI:https://doi.org/10.1103/PhysRevLett.106.036601.

H. An, Y. Kageyama, Y. Kanno, N. Enishi, and K. Ando, "Spin-torque generator engineered by natural oxidation of Cu", Nature Communications 7, 13069 (2016). https://doi.org/10.1038/ncomms13069.

S. Ding, A. Ross, D. Go, L. Baldrati, Z. Ren, F. Freimuth, S. Becker, F. Kammerbauer, J. Yang, G. Jakob, Y. Mokrousov, and M. Kläui, "Harnessing Orbital-to-Spin Conversion of Interfacial Orbital Currents for Efficient Spin-Orbit Torques", Physical Review Letters 125, 1.(2020) 77201. DOI:https://doi.org/10.1103/PhysRevLett.125. 177201.

Y. Tazaki, Y. Kageyama, H. Hayashi, T. Harumoto, T. Gao, J. Shi, and K. Ando, "Current-induced torque originating from orbital current", arXiv:2004.09165 (2020). https://doi.org/10.48550/arXiv. 2004.09165.

D. Go, D. Jo, T. Gao, K. Ando, S. Blugel, H.-W. Lee, and Y. Mokrousov, "Orbital Rashba effect in a surface-oxidized Cu film", Physical Review B 103, L121113 (2021). DOI:https://doi.org/10. 1103/PhysRevB.103.L121113.

X. Chen, Y. Liu, G. Yang, H. Shi, C. Hu, M. Li, and H. Zeng, "Giant antidamping orbital torque originating from the orbital Rashba-Edelstein effect in ferromagnetic heterostructures", Nature Communications 9, 2569 (2018). https://doi.org/10.1038/s41467-018-05057-z.

Z. C. Zheng, Q. X. Guo, D. Jo, D. Go, L. H. Wang, H. C. Chen, W. Yin, X. M. Wang, G. H. Yu, W. He, H. W. Lee, J. Teng, and T. Zhu, "Magnetization switching driven by currentinduced torque from weakly spin-orbit coupled Zr", Physical Review Research 2, 013127 (2020). DOI:https://doi.org/10.1103/PhysRevResearch.2.013127.

S. Lee, M.-G. Kang, D. Go, D. Kim, J.-H. Kang, T. Lee, G.-H. Lee, J. Kang, N. J. Lee, Y. Mokrousov, S. Kim, K.-J. Kim, K.-J. Lee, and B.-G. Park, "Efficient conversion of orbital Hall current to spin current for spin-orbit torque switching", Communications Physics 4, 234 (2021). https://doi.org/10.1038/s42005-021-00737-7.

Y.-G. Choi, D. Jo, K.-H. Ko, D. Go, K.-H. Kim, H. Gyum Park, C. Kim, B.-C. Min, G.-M. Choi, and H.-W. Lee, (2021), "Observation of the orbital Hall effect in a light metal Ti", Nature 619, 52-56 (2023). https://doi.org/10.1038/s41586-023-06101-9. arXiv:2109. 14847.

J. Xiao, Y. Liu, and B. Yan, "Detection of the Orbital Hall Effect by the Orbital-Spin Conversion" in Memorial Volume for Shoucheng Zhang (World Scientific, 2020), pp. 353. https://doi.org/10.1142/9789811231711_0015.

K. Ando, S. Takahashi, K. Harii, K. Sasage, J. Ieda, S. Maekawa, and E. Saitoh, "Electric Manipulation of Spin Relaxation Using the Spin Hall Effect", Physical Review Letters 101, 036601 (2008). DOI: 10.1103/PhysRevLett.101.036601.

S. Emori, T. Nan, T. M. Oxholm, C. T. Boone, J. G. Jones, B. M. Howe, G. J. Brown, D.E. Budil, and N. X. Sun, "Quantification of the spin-Hall anti-damping torque with a resonance spectrometer", Applied Physics Letters 106, 022406 (2015). https://doi.org/10. 1063/1.4906062.

K. Garello, I. M. Miron, C. O. Avci, F. Freimuth, Y. Mokrousov, S. Blugel, S. Auffret, O. Boulle, G. Gaudin, and P. Gambardella, "Symmetry and magnitude of spin-orbit torques in ferromagnetic heterostructures", Nat Nano 8, 587 (2013). https://doi.org/10.1038/nnano.2013.145.

J. Kim, J. Sinha, M. Hayashi, M. Yamanouchi, S. Fukami, T. Suzuki, S. Mitani, and H. Ohno, "Layer thickness dependence of the current-induced effective field vector in Ta|CoFeB|MgO", Nat Mater 12, 240 (2013). https://doi.org/10.1038/nmat3522.

Y. K. Kato, R. C. Myers, A. C. Gossard, and D. D. Awschalom, "Observation of the Spin Hall Effect in Semiconductors", Science 306, 1910 (2004). DOI: 10.1126/science.1105514.

O. Mosendz, J. E. Pearson, F. Y. Fradin, G. E. W. Bauer, S. D. Bader, and A. Hoffmann, "Quantifying Spin Hall Angles from Spin Pumping: Experiments and Theory", Physical Review Letters 104, 046601 (2010). DOI: https://doi.org/10.1103/PhysRevLett.104.046601.

V. Vlaminck, J. E. Pearson, S. D. Bader, and A. Hoffmann, "Dependence of spinpumping spin Hall effect measurements on layer thicknesses and stacking order", Physical Review B 88, 064414 (2013). DOI:https://doi.org/10.1103/PhysRevB.88.064414.

F. D. Czeschka, L. Dreher, M. S. Brandt, M. Weiler, M. Althammer, I. M. Imort, G. Reiss, A. Thomas, W. Schoch, W. Limmer, H. Huebl, R. Gross, and S. T. B. Goennenwein, "Scaling Behavior of the Spin Pumping Effect in Ferromagnet-Platinum Bilayers", Physical Review Letters 107, 046601 (2011). DOI:https://doi.org/10.1103/PhysRevLett. 107.046601.

L. Bai, P. Hyde, Y. S. Gui, C. M. Hu, V. Vlaminck, J. E. Pearson, S. D. Bader, and A. Hoffmann, "Universal Method for Separating Spin Pumping from Spin Rectification Voltage of Ferromagnetic Resonance", Physical Review Letters 111, 217602 (2013). DOI:https://doi.org/10.1103/PhysRevLett. 111.217602.

D. Wei, M. Obstbaum, M. Ribow, C. H. Back, and G. Woltersdorf, "Spin Hall voltages from a.c. and d.c. spin currents", Nature Communications 5, 3768 (2014). https://doi.org/10.1038/ncomms4768.

S. S. Kalarickal, P. Krivosik, M. Wu, C. E. Patton, M. L. Schneider, P. Kabos, T. J. Silva, and J. P. Nibarger, "Ferromagnetic resonance linewidth in metallic thin films: Comparison of measurement methods", Journal of Applied Physics 99, 093909 (2006). https://doi.org/10.1063/1.2197087.

I. Neudecker , G. Woltersdorf, B. Heinrich, T. Okuno, G. Gubbiotti, and C. H. Back, "Comparison of frequency, field, and time domain ferromagnetic resonance methods", Journal of Magnetism and Magnetic Materials 307, 148 (2006). https://doi.org/10.1016/j.jmmm. 2006.03.060.

A. Azevedo, L. H. Vilela-Leão, R. L .Rodríguez-Suárez, A. F. Lacerda Santos, and S. M. Rezende, "Spin pumping and anisotropic magnetoresistance voltages in magnetic bilayers: Theory and experiment", Physical Review B 83, 144402 (2011). DOI:https://doi.org/10.1103/PhysRevB.83.144402.

K. Kondou, H. Sukegawa, S. Mitani, K. Tsukagoshi , and S. Kasai, "Evaluation of Spin Hall Angle and Spin Diffusion Length by Using

(56) References Cited

OTHER PUBLICATIONS

Spin Current-Induced Ferromagnetic Resonance", Applied Physics Express 5, 073002 (2012). DOI 10.1143/APEX.5.073002.

K.-U. Demasius, T. Phung, W. Zhang, B. P. Hughes, S.-H. Yang, A. Kellock, W. Han ,A. Pushp, and S. S. P. Parkin, "Enhanced spin-orbit torques by oxygen incorporation in tungsten films", Nature Communications 7, 10644 (2016). https://doi.org/10.1038/ncomms10644.

K. Kondou, H. Sukegawa, S. Kasai, S. Mitani, Y. Niimi, and Y. Otani, "Influence of inverse spin Hall effect in spin-torque ferromagnetic resonance measurements", Applied Physics Express 9, 023002 (2016). DOI 10.7567/APEX.9.023002.

Y. Zhang, Q. Liu, B. Miao, H. Ding, and X. Wang, "Anatomy of electrical signals and dc-voltage line shape in spin-torque ferromagnetic resonance", Physical Review B 99, 064424 (2019). DOI:https://doi.org/10.1103/PhysRevB.99.064424.

R. Ben-Shalom, N. Bernstein, S. S. P. Parkin, S.-H. Yang, and A. Capua, "Determination of the spin Hall angle by the inverse spin Hall effect, device level ferromagnetic resonance, and spin torque ferromagnetic resonance: A comparison of methods", Applied Physics Letters 119, 042401 (2021). https://doi.org/10.1063/5.0057192.

K.-D. Lee, D.-J. Kim, H. Yeon Lee, S.-H. Kim, J.-H. Lee, K.-M. Lee, J.-R. Jeong, K.-S. Lee, H.-S. Song, J.-W. Sohn, S.-C. Shin, and B.-G. Park, "Thermoelectric Signal Enhancement by Reconciling the Spin Seebeck and Anomalous Nernst Effects in Ferromagnet/Non-magnet Multilayers", Scientific Reports 5, 10249 (2015). https://doi.org/10.1038/srep10249.

C. E. Patton, "Linewidth and Relaxation Processes for the Main Resonance in the Spin-Wave Spectra of Ni—Fe Alloy Films", Journal of Applied Physics 39, 3060 (1968). https://doi.org/10.1063/1.1656733.

Y. Zhao, Q. Song, S.-H. Yang, T. Su, W. Yuan, S. Parkin, J. Shi, and W. Han, "Experimental Investigation of Temperature-Dependent Gilbert Damping in Permalloy Thin Films", Scientific Reports 6.(2016) 22890. https://doi.org/10.1038/srep22890.

S. Yoshii, R. Ohshima, Y. Ando, T. Shinjo, and M. Shiraishi, "Detection of ferromagnetic resonance from 1 nm-thick Co", Scientific Reports 10, 15764 (2020). https://doi.org/10.1038/s41598-020-72760-7.

M. Zwierzycki, Y. Tserkovnyak, P. J. Kelly, A. Brataas, and G. E. W. Bauer , "First-principles study of magnetization relaxation enhancement and spin transfer in thin magnetic films", Physical Review B 71, 064420 (2005). DOI: https://doi.org/10.1103/PhysRevB.71.064420.

E. Barati, M. Cinal, D. M. Edwards, and A. Umerski, "Gilbert damping in magnetic layered systems", Physical Review B 90, 014420 (2014). DOI:https://doi.org/10.1103/PhysRevB.90.014420.

Banuazizi et al (2018). "Microwave probe stations with three-dimensional control of the magnetic field to study high-frequency dynamics in nanoscale devices". Review of Scientific Instruments, 89(6). https://doi.org/10.1063/1.5032219.

Rothschild et al (2022). "Generation of spin currents by the orbital Hall effect in Cu and Al and their measurement by a Ferris-wheel ferromagnetic resonance technique at the wafer level". Physical Review B, 106(14), 144415. DOI:https://doi.org/10.1103/PhysRevB.106.144415.

PCT International Search Report for International Application No. PCT/IL2023/050299 mailed Jun. 5, 2023, 6pp.

PCT Written Opinion for International Application No. PCT/IL2023/050299 mailed Jun. 5, 2023, 11pp.

* cited by examiner

Fig. 2D
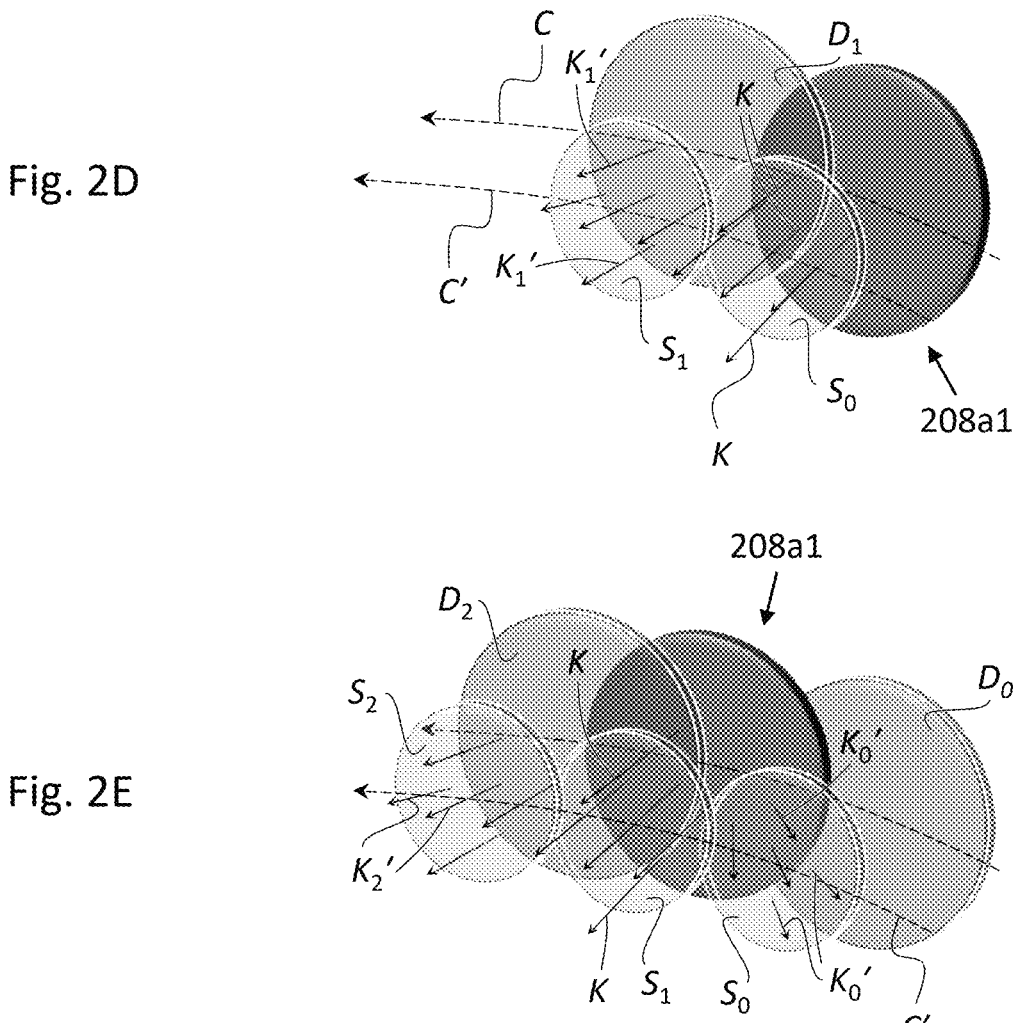
Fig. 2E
Fig. 2F
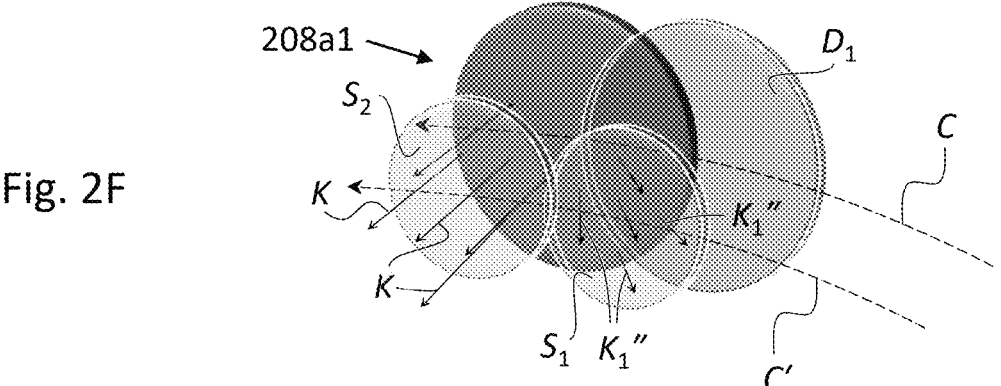

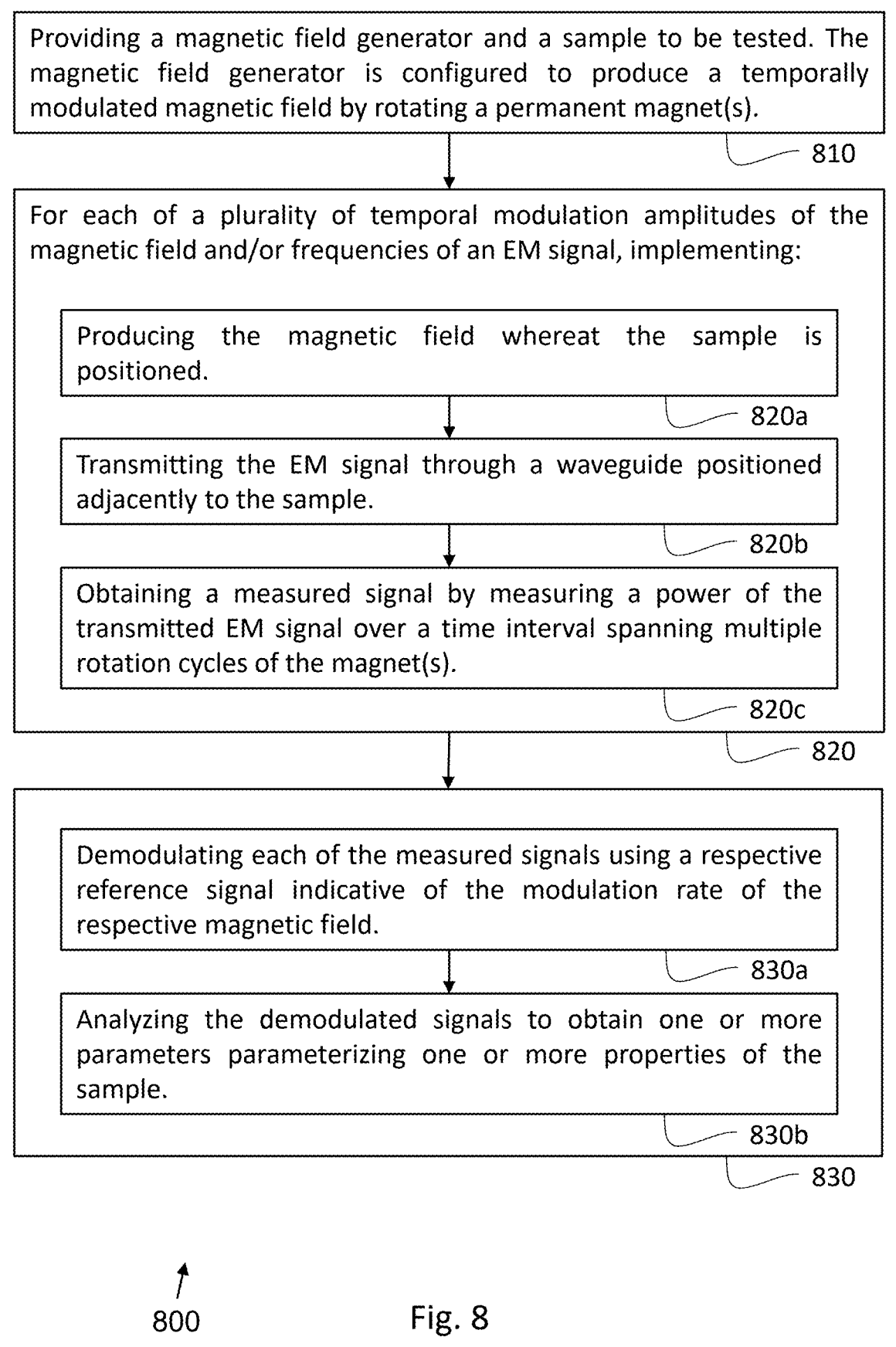

Providing a magnetic field generator and a sample to be tested. The magnetic field generator is configured to produce a temporally modulated magnetic field by rotating a permanent magnet(s).

⌐ 810

For each of a plurality of temporal modulation amplitudes of the magnetic field and/or frequencies of an EM signal, implementing:

Producing the magnetic field whereat the sample is positioned.

⌐ 820a

Transmitting the EM signal through a waveguide positioned adjacently to the sample.

⌐ 820b

Obtaining a measured signal by measuring a power of the transmitted EM signal over a time interval spanning multiple rotation cycles of the magnet(s).

⌐ 820c

⌐ 820

Demodulating each of the measured signals using a respective reference signal indicative of the modulation rate of the respective magnetic field.

⌐ 830a

Analyzing the demodulated signals to obtain one or more parameters parameterizing one or more properties of the sample.

Figure 9:
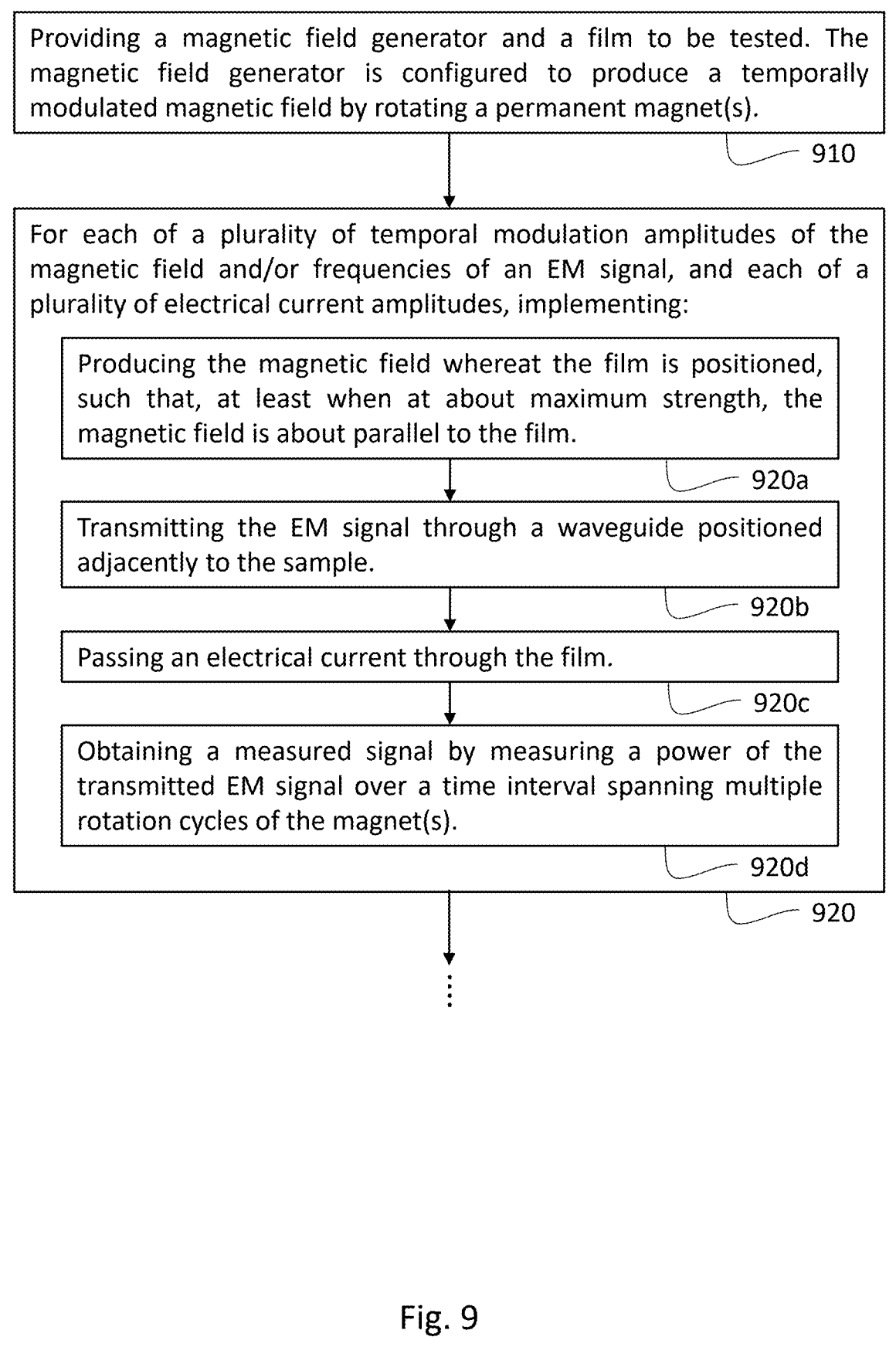

Providing a magnetic field generator and a film to be tested. The magnetic field generator is configured to produce a temporally modulated magnetic field by rotating a permanent magnet(s).

⎣⎯ 910

For each of a plurality of temporal modulation amplitudes of the magnetic field and/or frequencies of an EM signal, and each of a plurality of electrical current amplitudes, implementing:

Producing the magnetic field whereat the film is positioned, such that, at least when at about maximum strength, the magnetic field is about parallel to the film.

⎣⎯ 920a

Transmitting the EM signal through a waveguide positioned adjacently to the sample.

⎣⎯ 920b

Passing an electrical current through the film.

⎣⎯ 920c

Obtaining a measured signal by measuring a power of the transmitted EM signal over a time interval spanning multiple rotation cycles of the magnet(s).

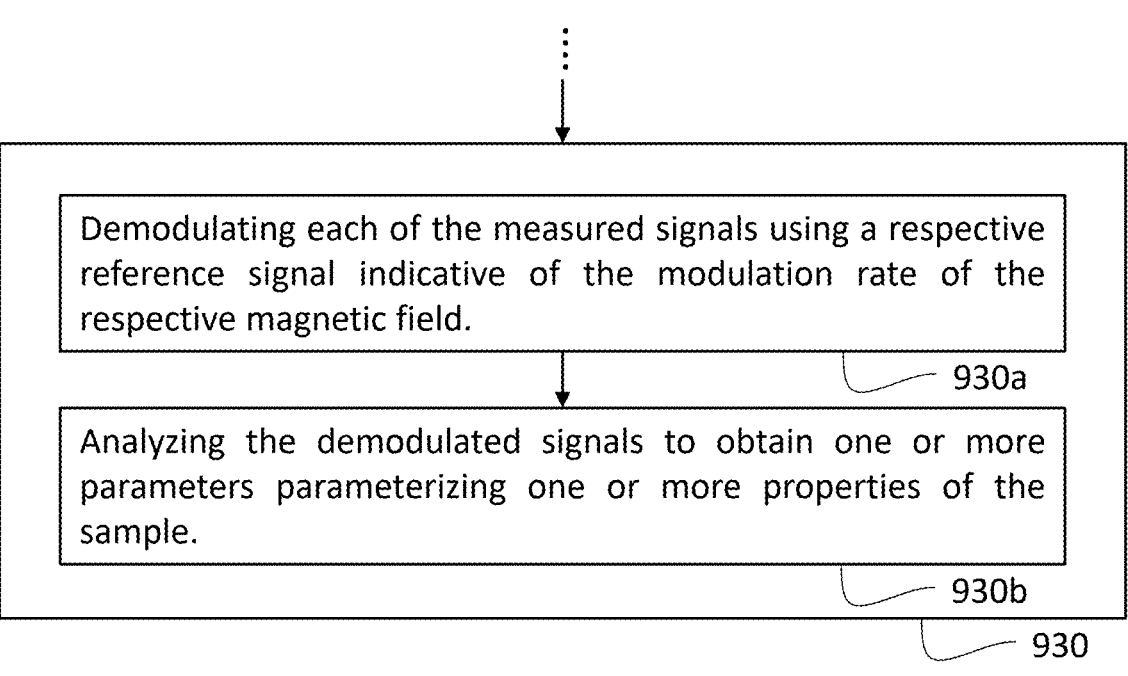
Demodulating each of the measured signals using a respective reference signal indicative of the modulation rate of the respective magnetic field.
930a
Analyzing the demodulated signals to obtain one or more parameters parameterizing one or more properties of the sample.
930b
930
900
Fig. 9 (Continuation)

1

DEVICES, SYSTEMS, AND METHODS FOR TESTING SAMPLES IN TEMPORALLY MODULATED MAGNETIC FIELDS

CROSS-REFERENCE TO RELATED APPLICATIONS

This application is a Bypass Continuation of PCT Patent Application No. PCT/IL2023/050299 having International filing date of Mar. 21, 2023, which claims the benefit of priority of U.S. Provisional Patent Application No. 63/269,734, filed Mar. 22, 2022, the contents of which are all incorporated herein by reference in their entirety.

TECHNICAL FIELD

The present disclosure relates generally to devices, systems, and methods for ferromagnetic resonance-based and electron spin resonance-based testing of samples.

BACKGROUND

Ferromagnetic resonance (FMR) based techniques are widely used in the emerging spintronics industry—for example, in developing new materials for various spintronics applications—as well as the semiconductor industry—for example, in quality control on the production line. A specific example is the use of FMR-based tools in the fabrication of spin transfer torque magnetoresistive random-access memory (STT-MRAM) chips.

State-of-the-art applications involving FMR tools, such as the characterization of ultra-thin ferromagnetic films, require increasingly high-sensitivity. One of the key factors determining the sensitivity is the temporal modulation depth of the (externally) applied magnetic field. Typically, a (temporally) modulated magnetic field is generated by repeatedly switching on and off an electric current passed through the coil of an electromagnet. However, for the purposes of high-depth (i.e. large-scale) modulation, such on-off switching may not be practical, due the combination of, on the one hand, large inductance (as high as a few henrys) of the electromagnet, which is required in order to generate a sufficiently strong magnetic field, and, on the other hand, the relatively high currents (on the order of a few tens of amperes), which have to be passed through the coil of the electromagnet. The addition of small (low induction) electromagnets on top of the (large) electromagnet facilitates rapid modulation about the magnetic field generated by the large magnet. However, the induced (rapid) modulation is small and the overall sensitivity remains low. Accordingly, tasks, such as the measurement of the FMR response in metallic ultra-thin films and measurement of spin currents, are (at least ostensibly) beyond scope.

In electron spin resonance (ESR) spectroscopy, the density of the spins in the tested sample, which are available to interact with the applied magnetic field, is very low. Accordingly, ESR spectroscopy is primarily carried out using a cavity-FMR setup. Even though cavity-FMR provides high sensitivity, it operates at a single frequency, is very expensive, and takes a lot of physical space—typically a dedicated room.

There exists a need in the art for FMR and ESR systems, which are highly sensitive, broadband, non-complex, compact, cheap, and fast.

SUMMARY

Aspects of the disclosure, according to some embodiments thereof, relate to devices, systems, and methods for ferromagnetic resonance (FMR) based and electron spin resonance (ESR) based applications. More specifically, but not exclusively, aspects of the disclosure, according to some embodiments thereof, relate to devices, systems, and methods for FMR-based testing of magnetic thin and ultra-thin (few atoms thick) films.

The present application addresses the limitations of conventional (electromagnet-based) FMR and ESR systems by disclosing tools and techniques for FMR and ESR based testing, which are not reliant on the use of electromagnets. Advantageously, the disclosed devices, systems, and methods allow for the generation of large-scale temporally modulated magnetic fields. Accordingly, the disclosed systems and methods allow for direct analysis of an obtained FMR signal rather than the derivative thereof (as often required when the modulation is small). As a further advantage, as compared to conventional FMR and ESR systems, the disclosed FMR and ESR systems are easier to operate and maintain, compact (tabletop as compared to requiring a dedicated large space in typical state-of-the-art FMR and ESR systems), and cheap. In particular, when applied to the measurements of spin currents in metallic, magnetic, and/or magnetizable thin films, the disclosed FMR systems advantageously do not rely on the presence of components patterned into the thin film, which are dedicated to measurement of spin currents. Accordingly, such components can altogether be dispensed with, which cuts production times by weeks, and allows for in-line inspection. Finally, unlike cavity FMR, the disclosed systems and methods are advantageously broadband.

Thus, according to an aspect of some embodiments, there is provided a magnetic field generating device for producing a temporally modulated magnetic field. The device includes a frame, a motor, and a magnet unit. The frame is rotatable about a rotational axis intersecting the frame from a frame back side (i.e. the back side of the frame) to a frame front side (i.e. the front side of the frame). The motor is configured to rotate the frame at a controllable angular velocity. The magnet unit includes one or more permanent magnets. The magnet unit is mounted on the frame front side at a location offset by a distance $r_0$ relative to the rotational axis, and forms in front of the magnet unit a first magnetic field. When the frame is rotated, in front thereof, at any azimuth and offset relative to the rotational axis by the distance $r_0$, a respective temporally modulated second magnetic field, is generated.

According to some embodiments of the device, the frame is a plate with the frame back side constituted by a plate back face (i.e. the back face of the plate) and the frame front side constituted by a plate front face (i.e. the front face of the plate).

According to some embodiments of the device, when at maximum strength, the second magnetic field equals the first magnetic field.

According to some embodiments of the device, the rotational axis is about perpendicular to the frame.

According to some embodiments of the device, the first magnetic field is about spatially uniform over each of a plurality of parallel planes arranged one after the other at increasing distance from the magnet unit.

According to some embodiments of the device, the first magnetic field is about parallel to the frame.

According to some embodiments of the device, the magnet unit includes a pair of adjacently mounted permanent magnets of opposite polarity.

According to some embodiments of the device, a first magnet of the pair of permanent magnets is curved along a first arc at radius $r_1 < r_0$ and a second magnet of the pair of permanent magnets is curved along a second arc at radius $r_2 > r_0$.

According to some embodiments of the device, an angle subtended by the arcs is sufficiently large so that a temporal modulation profile is about an on/off square modulation.

According to some embodiments of the device, the first magnetic field is about perpendicular to the frame.

According to some embodiments of the device, the magnet unit consists of a single permanent magnet.

According to some embodiments of the device, the device includes a plurality of the magnet unit arranged around the rotational axis.

According to some embodiments of the device, the plurality of the magnet unit is symmetrically arranged around the rotational axis.

According to some embodiments of the device, the device further includes an additional magnet unit. The additional magnet unit is mounted on the frame front side and is offset relative to the rotational axis by about the distance $r_0$. The additional magnet unit is permanent and forms in front of the additional magnet unit a third magnetic field, When the frame is rotated, the second magnetic field is modulated between the first magnetic field and the third magnetic field.

According to some embodiments of the device, the third magnetic field points oppositely to the first magnetic field.

According to some embodiments of the device, magnitudes of the first magnetic field and the third magnetic field are equal.

According to some embodiments of the device, the device includes a plurality of pairs of the magnet unit and the additional magnet unit. (That is, the device includes n≥2 of the magnet unit and n≥2 of the additional magnet unit.) The pairs are arranged around the rotational axis at regular angular intervals such that each in the plurality of the magnet unit is positioned between a respective pair from the plurality of the additional magnet unit.

According to some embodiments of the device, the device further includes displacement infrastructure configured to translate the frame in direction which is about parallel to the rotational axis.

According to some embodiments of the device, the displacement infrastructure includes a translatable stage on which the frame and the motor are mounted.

According to some embodiments of the device, the frame is made of or includes a non-magnetizable material.

According to some embodiments of the device, the motor is or includes a servomotor.

According to some embodiments of the device, the frame is disc-shaped.

According to some embodiments of the device, the frame includes a hole through the frame (e.g. an offset hole in the plate). The hole is positioned near the magnet unit.

According to an aspect of some embodiments, there is provided a system for magnetic testing of samples. The system includes a magnetic field generator, a waveguide, a first sensor, an electromagnetic (EM) signal generator, a second sensor, and heterodyne-based demodulator. The magnetic field generator is configured to, by rotating at least one magnet, which is permanent, produce a temporally modulated magnetic field over a region whereat a sample (which is to be tested) is positioned. The waveguide is positionable adjacently to the sample. The first sensor is configured to obtain a first signal by directly and/or indirectly measuring a modulation rate of the produced magnetic field. The EM signal generator is coupled to a first end of the waveguide and is configured to transmit an EM signal (i.e. an EM wave) into the waveguide. The second sensor is coupled to a second end of the waveguide and is configured to obtain a measured signal by measuring a power of a portion of the EM signal transmitted through the waveguide. The heterodyne-based demodulator is communicatively associated with the first sensor and the second sensor and is configured to use a reference signal, constituted by or obtained from the first signal, to demodulate the measured signal.

According to some embodiments of the system, the system further includes displacement infrastructure configured to allow controllably varying a distance between the magnetic field generator and the sample, and thereby allow commensurately varying the maximum strength of the produced magnetic field to which the sample is subjected (i.e. which is applied on the sample).

According to some embodiments of the system, the system further includes a controller. The controller is communicatively associated with at least the displacement infrastructure and the magnetic field generator and is configured to command the displacement infrastructure to vary the distance between the magnetic field generator and the sample, and/or to command the EM signal generator to vary a frequency of the EM signal, so as to obtain a plurality of the measured signal and a plurality of the demodulated signal.

According to some embodiments of the system, the magnetic field generator is any one of the above-described embodiments of the magnetic field generating device.

According to some embodiments of the system, the heterodyne-based demodulator is a lock-in amplifier.

According to some embodiments of the system, the first sensor is or includes a Hall sensor, a mechanical magnetic switch, or a magnetic pickup coil with an electric amplifier).

According to some embodiments of the system, the first sensor includes a photodetector.

According to some embodiments of the system, the first sensor is an opto-coupler or a slotted opto-coupler track sensor.

According to some embodiments of the system, wherein the first sensor is or includes the Hall sensor, the mechanical magnetic switch, or the magnetic pickup coil with an electric amplifier, the modulation rate is directly measured.

According to some embodiments of the system, the second sensor is or includes a RF power detector.

According to some embodiments of the system, the RF power detector is an RF diode detector.

According to some embodiments of the system, the EM signal generator is configured to generate EM signals in the radiofrequency (RF) range. According to some such embodiments, the EM signal generator is configured to generate EM signals in the microwave range.

According to some embodiments of the system, the waveguide is a planar transmission line selected from a microstrip, a coplanar waveguide, and a stripline.

According to some embodiments of the system, the sample is or includes a metallic, magnetic, and/or magnetizable thin film, which is exposed on the sample. The waveguide is positionable adjacently to the thin film.

According to some embodiments of the system, the sample includes a thin film, which may include metallic material (e.g. include a metallic layer), and which is exposed on the sample. The waveguide is positionable adjacently to the thin film. According to some such embodiments, the thin film may include/additionally include magnetic material and/or magnetizable material (e.g. additionally including a magnetic/magnetizable layer). In particular, the waveguide is positionable such that the magnetic/magnetizable layer is positioned between the waveguide and the metallic layer.

According to some embodiments of the system, the thin film includes a magnetic material and/or magnetizable material.

According to some embodiments of the system, the thin film is multilayer (e.g. bilayer) including a metallic layer and a magnetic layer.

According to some embodiments of the system, the thin film is made of or includes a ferromagnetic material, a ferrimagnetic material, and/or an anti-ferromagnetic material.

According to some embodiments of the system, the thin film is multilayer (e.g. bilayer) including a metallic layer and a magnetic layer.

According to some embodiments of the system, the sample includes one or more paramagnetic centers.

According to some embodiments of the system, the sample includes free radicals.

According to some embodiments of the system, the sample is disc-shaped.

According to some embodiments of the system, the system further includes a sample holder configured to support the sample.

According to some embodiments of the system, the sample holder is positioned between the magnetic field generator and the waveguide.

According to some embodiments of the system, wherein the system includes the controller, the controller is configured to command the displacement infrastructure to vary the distance between the magnetic field generator and the sample, such that, for at least some of the frequencies of the EM signals, an interaction between EM radiation leaked from the waveguide and spins in the sample reaches resonance.

According to some embodiments of the system, further including one or more processors configured to receive the plurality of the demodulated signal and based thereon compute one or more sample parameters parameterizing one or more properties of the sample.

According to some embodiments of the system, in order to compute the one or more sample parameters, for each of the frequencies of the EM signals, the one or more processors are configured to extract respective one or more spectral parameters characterizing an absorption peak corresponding to the respective resonance.

According to some embodiments of the system, the one or more properties include one or more of a magnetization saturation, a Gilbert damping, an effective anisotropy, a magnetic inhomogeneity, a gyromagnetic ratio, a g-factor, and one or more resonance linewidths (corresponding to one or more frequencies of the EM signal, respectively).

According to some embodiments of the system, the sample is in the form of liquid drops or a powder disposed on the waveguide.

According to some embodiments of the system, wherein the system further includes the sample holder, wherein the sample is or includes the thin film, and wherein the waveguide is the planar transmission line, the system further includes an electric power supply, and a first conductive interface and a second conductive interface disposed on a substrate (dielectric layer) of the planar transmission line. The first conductive interface and the second conductive interface are coupled to a first terminal and a second terminal, respectively, of the electric power supply. The planar transmission line and the sample holder are configured to allow positioning thereof such that, in addition to the sample being adjacent to an elongated conductor of the planar transmission line with the thin film facing the elongated conductor and the produced magnetic field being in-plane, at least when at about maximum strength, the conductive interfaces contact the thin film so as to enable passing an electric current therethrough, thereby facilitating measurement of spin currents in the thin film. According to some such embodiments, the planar transmission line and the sample holder are configured to allow positioning thereof such that the in-plane magnetic field, at least when at about maximum strength, points along a selectable azimuth angle.

According to some embodiments of the system, the thin film does not include patterned components dedicated to measurement of spin currents.

According to some embodiments of the system, the electric power supply is configured to supply a controllable DC current.

According to some embodiments of the system, wherein the planar transmission line is the microstrip, the EM signal generator is configured to generate EM signals in the RF range. Each of the first conducting interface and the second conducting interface is, or includes, conductive lacquer, a conductive rubber, a conductive epoxy glue, and/or a conductive silver paint.

According to some embodiments of the system, further including the one or more processors, the one or more processors are configured to compute a spin Hall angle of the thin film based at least on the plurality of the demodulated signal and parameters of the electric current.

According to an aspect of some embodiments, there is provided a method for magnetic testing of samples. The method includes:

A setup stage, which includes providing a sample to be tested and a magnetic field generator configured to produce a temporally modulated magnetic field by rotating at least one magnet, which is permanent.

A data acquisition stage including for each of a plurality of temporal modulation amplitudes of the magnetic field and/or frequencies of the EM signals:

Producing the magnetic field whereat the sample is positioned.

Transmitting an EM signal into a waveguide positioned adjacently to the sample.

Obtaining a measured signal by measuring a power of a transmitted portion of the EM signal over a time interval spanning multiple rotation cycles of the at least one magnet.

A data processing stage including:

Demodulating each of the measured signals using a respective reference signal indicative of the modulation rate of the respective magnetic field.

Processing the demodulated signals to obtain one or more sample parameters parameterizing one or more properties of the sample.

According to some embodiments of the method, the magnetic field generator is any one of the above-described embodiments of the magnetic field generating device.

According to some embodiments of the method, the plurality of modulation amplitudes of the magnetic field, whereat the sample is positioned, includes a resonance modulation amplitude for which a coupling between a respective one of the EM signals and spins in the sample reaches resonance.

According to some embodiments of the method, in order to obtain the one or more sample parameters, for each of the frequencies of the EM signals, respective one or more spectral parameters, which characterize an absorption peak corresponding to the respective resonance, are extracted.

According to some embodiments of the method, the plurality of modulation amplitudes of the magnetic field, whereat the sample is positioned, is realized by varying a distance between the magnetic field generator and the sample.

According to some embodiments of the method, the sample is or includes a metallic, magnetic, and/or magnetizable thin film, which is exposed on the sample. The waveguide is positioned adjacently to the thin film.

According to some embodiments of the method, the sample includes a thin film, which may include a metallic material (e.g. include a metallic layer, and which is exposed on the sample. The waveguide is positioned adjacently to the thin film. According to some such embodiments, the thin film includes/additionally includes magnetic material and/or magnetizable material (e.g. additionally including a magnetic/magnetizable layer). In particular, the waveguide is positioned such that the magnetic/magnetizable layer is positioned between the waveguide and the metallic layer.

According to some embodiments of the method, the thin film includes magnetic material and/or magnetizable material.

According to some embodiments of the method, the thin film is multilayer (e.g. bilayer) including a metallic layer and a magnetic layer.

According to some embodiments of the method, the sample is made of or includes a ferromagnetic material, a ferrimagnetic material, an anti-ferromagnetic material, and/or a paramagnetic material.

According to some embodiments of the method, the sample includes one or more paramagnetic centers.

According to some embodiments of the method, the sample includes free radicals.

According to some embodiments of the method, the sample is in the form of liquid drops or a powder disposed on the waveguide.

According to some embodiments of the method, the one or more properties of the sample include one or more of a magnetization saturation, a Gilbert damping, an effective anisotropy, a magnetic inhomogeneity, a gyromagnetic ratio, a g-factor, and one or more resonance linewidths (corresponding to one or more frequencies of the EM signal, respectively).

According to some embodiments of the method, the magnetic field whereat the sample is positioned, at least when at about maximum strength, is parallel to the thin film (and, optionally, points along a selectable azimuth angle. The data acquisition stage further includes, implementing each of the substages thereof for each of a plurality of amplitudes of an electric current, which simultaneously to the transmitting of the EM signal, is passed through the thin film.

According to some embodiments of the method, the electric currents are DC currents.

According to some embodiments of the method, the one or more properties include a spin Hall angle of the thin film.

According to some embodiments of the method, the thin film does not include patterned components dedicated to measurement of spin currents.

According to some embodiments of the method, the data acquisition stage further includes, for each of the frequencies of the EM signals, in order to obtain the respective reference signal, directly and/or indirectly measuring the modulation rate.

According to some embodiments of the method, the modulation rates are directly measured using a Hall sensor, a mechanical magnetic switch, and/or a magnetic pickup coil with an electric amplifier).

According to some embodiments of the method, the EM signals are in the RF range. According to some such embodiments, the EM signals are in the microwave range.

According to some embodiments of the method, the waveguide is a planar transmission line selected from a microstrip, a coplanar waveguide, and a stripline.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the methods herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, flash memories, solid state drives (SSDs), or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

FIGS. 2D to 2F schematically depict motion of the magnet unit of FIGS. 2B and 2C due to the rotation of the plate and corresponding change in the magnetic field at a given distance from the plate, offset relative to a rotational axis of the plate, and azimuth;

FIG. 8 presents a flowchart of a method for magnetic testing of samples, according to some embodiments;

FIG. 9 presents a flowchart of a method for FMR-based testing of thin films, according to some embodiments.

DETAILED DESCRIPTION

Figure 1A:
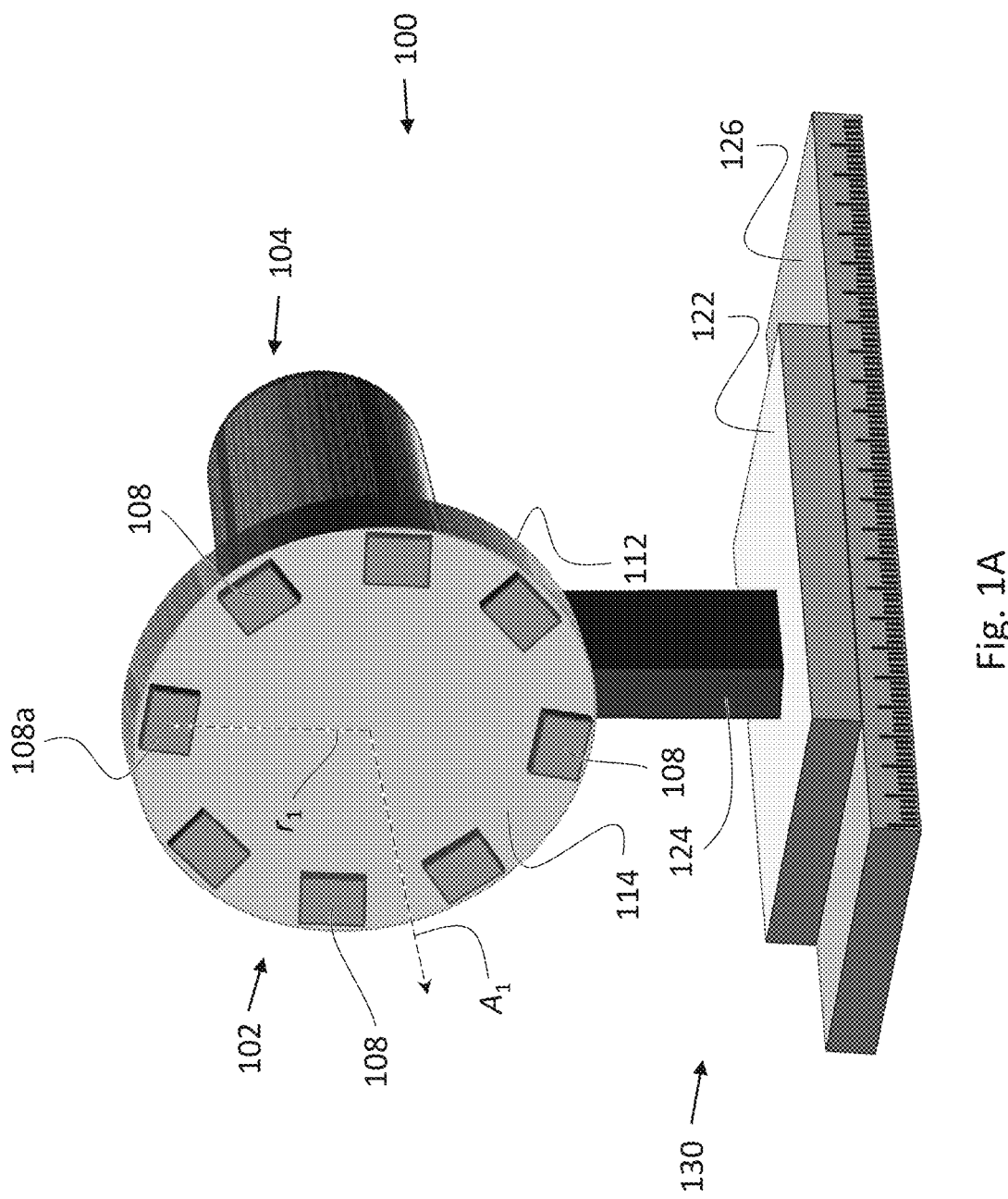
FIG. 1A schematically depicts a magnetic field generating device including a plate and one or more magnet units, each respectively including at least one permanent magnet mounted on the plate, so as to allow producing a temporally modulated magnetic field by rotating the plate, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of—and including—a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m" (and also covers exact equality, i.e. the statement "the length of the element is equal to about 1 m" also covers the case wherein the length of the element is equal to 1 m). According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

Referring to the figures, in block diagrams, optional elements may appear within boxes delineated by a dashed line.

Magnetic Field Generating Devices

According to an aspect of some embodiments, there is provided a magnetic field generating device for producing a temporally modulated magnetic field. FIG. 1 schematically depicts such a magnetic field generating device: a (magnetic field generating) device 100. According to some embodiments, device 100 includes a plate 102, a motor 104, and one or more magnet units each including at least one permanent magnet. As a non-limiting example, and as depicted in FIG. 1, the one or more magnet units include a plurality of magnet units 108 (not all of which are numbered).

Plate 102 is configured to be rotated about a rotational axis $A_1$. The rotational axis $A_1$ may intersect plate 102 from a plate back face 112 (i.e. the back face of plate 102) to a plate front face 114 (i.e. the front face of plate 102). According to some embodiments, the rotational axis $A_1$ extends through a center of plate 102 (e.g. through the center of a circle defined by plate 102 when plate 102 is disc-shaped as depicted in FIG. 1A). According to some embodiments, the rotational axis $A_1$ may be about perpendicular to plate 102. Motor 104 is mechanically associated with plate 102 and is configured to rotate plate 102 about the rotational axis $A_1$. According to some embodiments, motor 104 may be configured to rotate plate 102 at a controllably selectable angular velocity. According to some embodiments, motor 104 may be configured to allow varying the angular velocity speed within a single revolution of plate 102. According to some embodiments, motor 104 may be a servo motor.

Magnet units 108 are mounted on plate front face 114. Each of magnet units 108 is offset relative to the rotational axis $A_1$. According to some embodiments, each of magnet units 108 is offset relative to the rotational axis $A_1$ by about a same distance $r_1$.

According to some embodiments, magnet units 108 may be about symmetrically disposed about the rotational axis $A_1$, such that about the same angle is subtended between each pair of adjacent magnet units (e.g. about 120° when there are three magnet units, about 45° when there are eight magnet units), and such that each of magnet units 108 is likewise oriented relative to the rotational axis $A_1$.

According to some embodiments, magnet units 108 may be about anti-symmetrically disposed about the rotational axis $A_1$, such that about the same angle is subtended between each pair of adjacent magnet units, and such that adjacent magnet units are oppositely oriented relative to the rotational axis $A_1$.

Figures 3A, 3B:
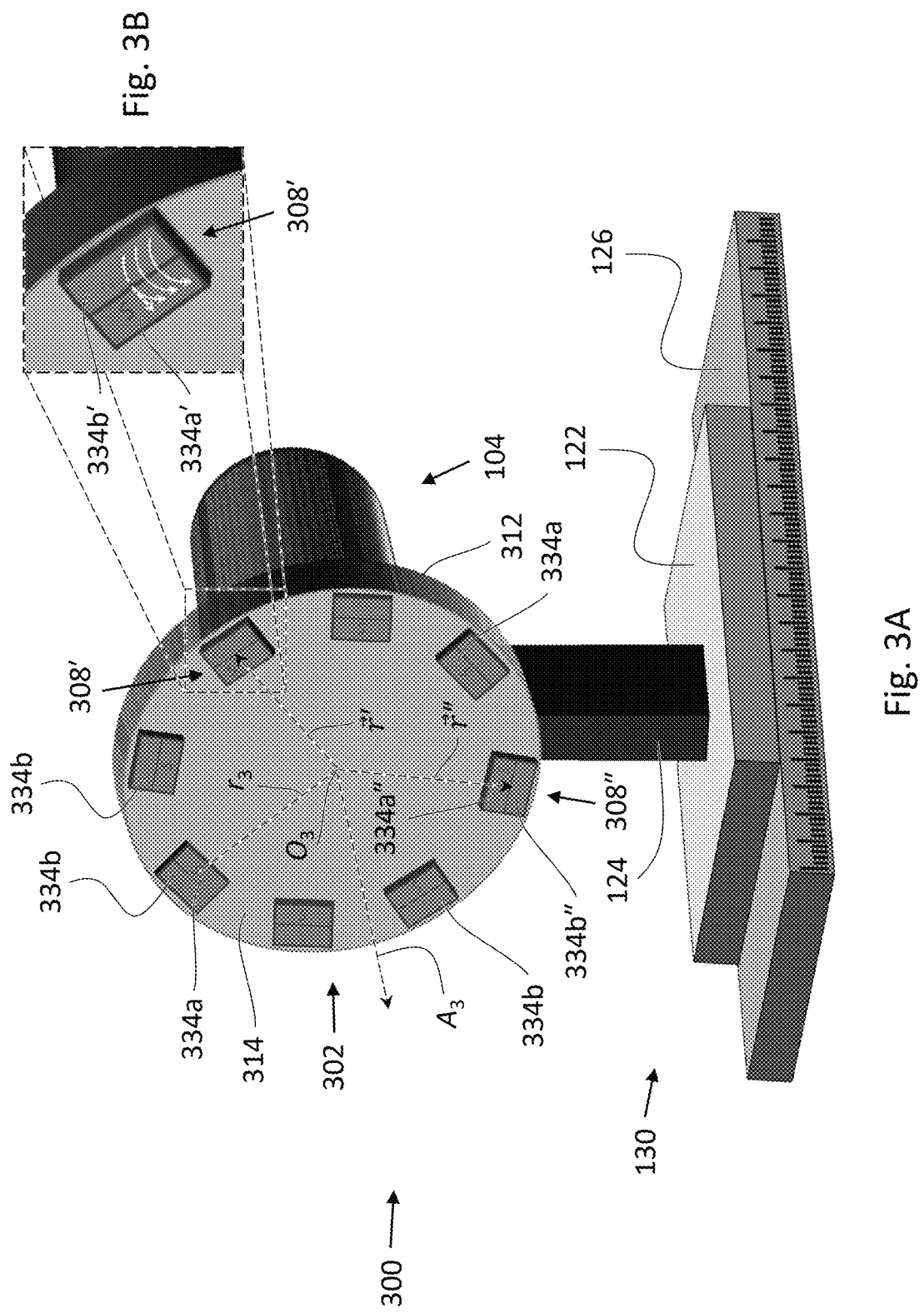
FIG. 3A schematically depicts a magnetic field generating device corresponding to specific embodiments of the device of FIG. 1A, wherein each of the magnet units includes a pair of permanent magnets of opposite polarity and the magnet units are symmetrically arranged.
FIG. 3B provides a closeup view a magnet unit included in the magnetic field generating device corresponding of FIG. 3A, according to some embodiments.

According to some embodiments, such as the embodiments described in relation to FIG. 3B, the arrangement of magnet units 108 (e.g. the distance between adjacent magnet units) and the shapes thereof may be selected such that the (temporal) modulation profile of the produced magnetic field (i.e. the temporal dependence of the magnetic field produced by device 100 (when plate 102 is rotated) about matches an offset square wave alternating between zero and a constant value (depending on the distance from plate front face 114). This type of modulation profile is also referred to herein to as "on/off square modulation".

According to some embodiments, e.g. wherein lateral dimensions (in parallel to plate 104) of magnet units 108 are small relative to the distances there between, an effectively, pulse-like modulation profile may be achieved.

According to some embodiments, such as some of the embodiments described with respect to FIG. 3A, the arrangement of magnet units 108 and the shapes thereof may be selected such that modulation profile of the magnetic field produced thereby is about sinusoidal.

More complex modulation profiles may be achieved by employing a large number of magnet units of different strengths. In particular, smooth modulation profiles may be achieved by employing a large number of magnet units set adjacently to one another near the circumference of the plate, with neighboring magnet units differing in strength by small increments. Further, the skilled person will readily perceive that a modulation profile attained by rotating the plate at constant angular velocity may be deformed by varying the angular velocity (optionally, also within a single rotation of the plate).

According to some embodiments, device 100 also includes a base plate 122 and an arm 124, which is mounted on base plate 122 and extends therefrom about perpendicularly thereto. Motor 104 and plate 102 are supported by arm 124. In particular, motor 104 may be mounted on arm 124. According to some embodiments, base plate 122 may be controllably translatable on a platform 126, thereby allowing for controllable translation of plate 102. More specifically, according to some such embodiments, base plate 122 may be controllably at least along a direction about parallel to the rotational axis $A_1$. Base plate 122, arm 124, and platform 126 constitute or form part of displacement infrastructure 130, which according to some embodiments, may form part of device 100. According to some embodiments, displacement infrastructure 130 may include a motor (not shown), such as a stepper motor.

According to some embodiments, plate 102 may be made of a non-magnetizable material, such as a polymeric material.

While in FIG. 1A device 100 is depicted as including a plurality of magnet units (i.e. magnet units 108), according to some alternative embodiments, not depicted in FIG. 1A, device 100 may include a single magnet unit (e.g. magnet unit 108*a*).

The skilled person will readily perceive that instead of plate 102 a frame (e.g. an annular frame) may be used. The scope of the disclosure is thus to be understood as covering this option.

Figure 1B:
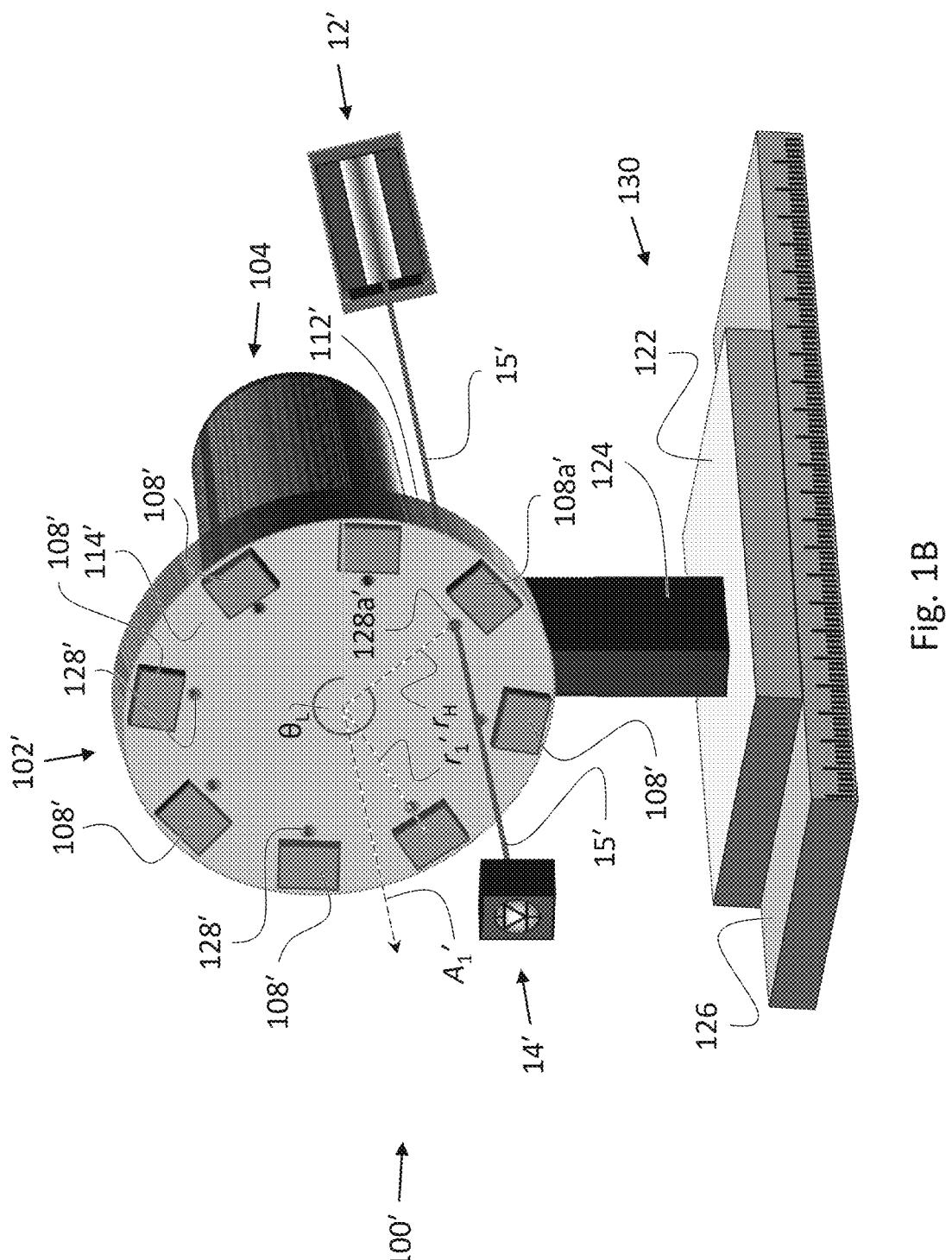
FIG. 1B schematically depicts a magnetic field generating device corresponding to specific embodiments of the magnetic field generating device of FIG. 1A, which include at least one offset hole.

FIG. 1B schematically depicts a magnetic field generating device 100', which corresponds to specific embodiments of device 100 including holes next to at least some of the magnet units. More specifically, device 100' includes a plate 102', motor 104, magnet units 108', and, optionally, displacement infrastructure 130. Plate 102' and magnet units 108' correspond to specific embodiments of plate 102 and magnet units 108, respectively. Plate 102' includes one or more holes 128' (not all of which are numbered). Each of holes 128' extends from a plate back face 112' to a plate front face 114' and is offset relative to a rotational axis $A_1'$ about which plate 102' may be rotated by motor 104. According to some embodiments, and as depicted in FIG. 1B, the number of holes 128' equals the number of magnet units 108' with each of holes 128' being positioned next to a respective one of magnet units 108'. According to some such embodiments, holes 128' extend in parallel to one another and are offset by a same distance $r_H$ relative to the rotational axis $A_1'$. According to some embodiments, and as depicted in FIG. 1B, $r_H < r_1'$.

Holes 128' may be used to indirectly measure the modulation rate of the produced magnetic field (or equivalently, when the magnet units and the holes are symmetrically disposed on the plate, the rotation frequency of the plate). To this end, and as depicted in FIG. 1B, a laser beam generator 12' and a photodetector 14' may be employed. Laser beam generator 12' and photodetector 14' do not form part of device 100'. Laser beam generator 12' and photodetector 14' are positioned opposite one another on opposite sides of plate 102' with laser beam generator 12' facing plate back face 112' and photodetector 14' facing plate front face 114'.

Laser beam generator 12' is positioning is such that a laser beam 15' produced thereby strikes plate back face 112' at a given azimuth $\theta_L$ and at the distance $r_H$ relative to the rotational axis $A_1'$. Accordingly, in operation (i.e. when plate 102' is rotated about the rotational axis $A_1'$), when any one of holes 128' (a hole 128a' adjacent to a magnet unit 108a' in FIG. 1B) has been rotated to the azimuth $\theta_L$, laser beam 15' passes through the hole and is sensed by photodetector 14'. Otherwise, laser beam 15' is blocked by plate 102'. The rate at which photodetector 14' senses laser beam 15' depends on the angular velocity of plate 102', which, in turn, is indicative of the modulation rate of the magnetic field produced in front of plate 102' at a given azimuth angle.

With respect to FIG. 1B, the measurement of the modulation rate is said to "indirect" in the sense that it is not the produced magnetic field, which is measured.

According to some alternative embodiments, not depicted in FIG. 1B, instead of (or in addition to) including holes 128', plate 102' may have mounted thereon one or more offset mirrors with the laser beam generator and the photodetector being positioned in front of the face of plate 102' on which the one or more mirrors are mounted. According to some other alternative embodiments, also not depicted in FIG. 1B, instead of (or in addition to) including holes 128', plate 102' may be made of a semi-transparent material. The laser beam generator and the photodetector may be positioned on opposite sides of plate 102'. The laser beam generator may be configured to produce a laser beam which strikes plate front face 114' at a distance of about $r_1'$ from the rotational axis $A_1'$, so that whenever not blocked by one of magnet units 108', some of the laser beam passes through plate 102' and is sensed by the photodetector.

Figures 2A, 2B:
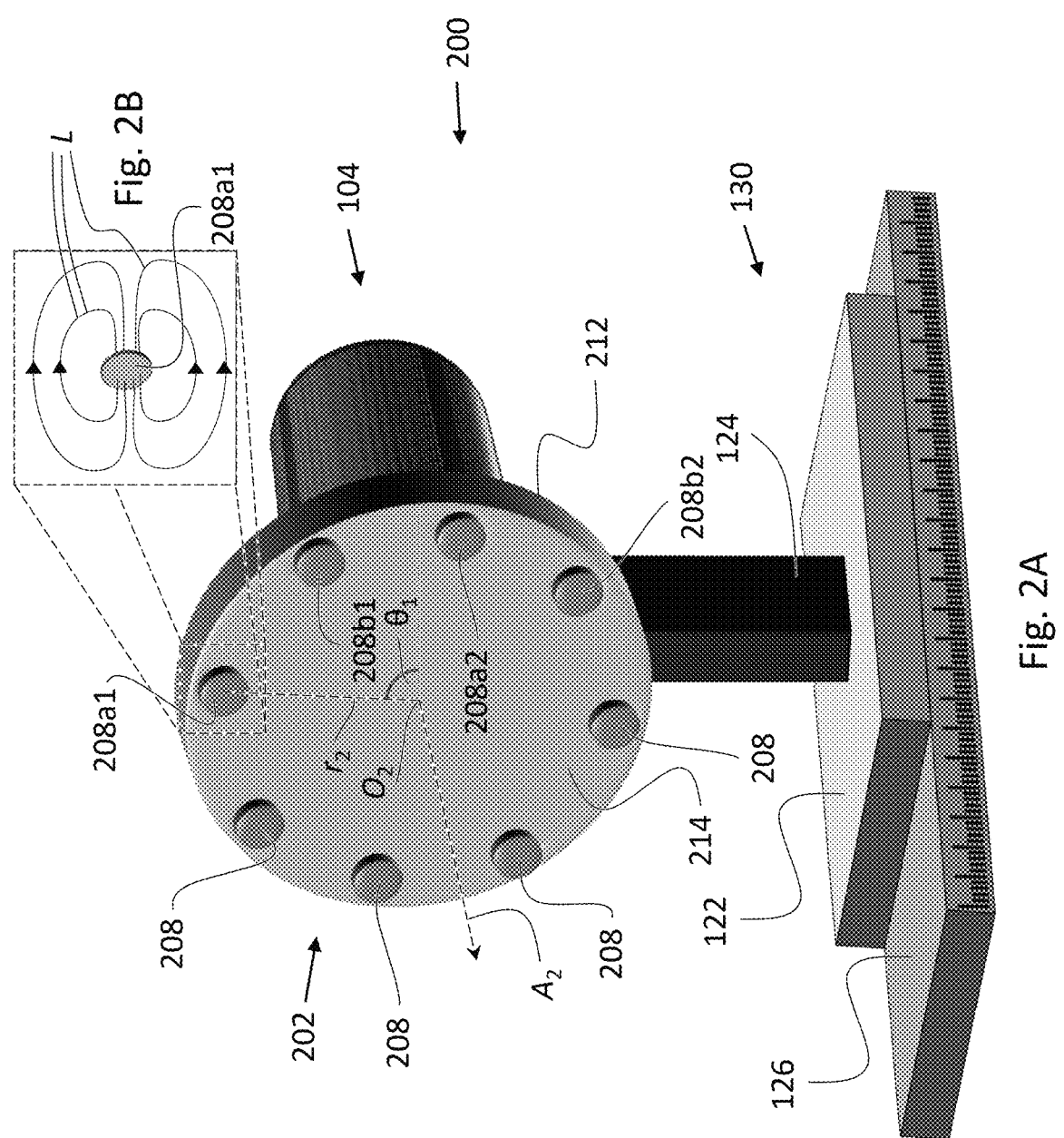
FIG. 2A schematically depicts a magnetic field generating device corresponding to specific embodiments of the device of FIG. 1A, wherein each of the magnet units includes a single permanent magnet.
FIGS. 2B and 2C provide closeup views of one of the magnet units included in the magnetic field generating device of FIG. 2A, according to some embodiments.

FIG. 2A schematically depicts a magnetic field generating device 200, which corresponds to specific embodiments of device 100, wherein each of the magnet units includes a single permanent magnet. More specifically, device 200 includes a plate 202, motor 104, magnet units 208, and displacement infrastructure 130. Plate 202 and magnet units 208 correspond to specific embodiments of plate 102 and magnet units 108, respectively. Also indicated a plate back face 212 and a plate front face 214.

Each of magnet units 208 is offset by about $r_2$ relative to a rotational axis $A_2$ about which plate 202 is configured to be rotated. Also indicated is an origin $O_2$ whereat the rotational axis $A_2$ intersects plate front face 214. According to some embodiments, magnet units 208 may be about identical with each being configured to produce a respective magnetic field, which in front of the magnet unit points away from the magnet unit. Put differently, in such embodiments, each of magnet units 208 has the same pole (e.g. the north pole) exposed on plate front face 214. Magnetic field lines L of one of magnet units 208, a magnet unit 208a1, are shown in FIG. 2B, which provides a closeup view of magnet unit 208a1 and a portion of plate 202 therearound, according to some embodiments.

While in FIG. 2A device 200 is depicted as including a plurality of magnet units (i.e. magnet units 208), according to some alternative embodiments, not depicted in FIG. 2A, device 200 may include a single magnet unit (e.g. magnet unit 208a1).

Figure 2C:
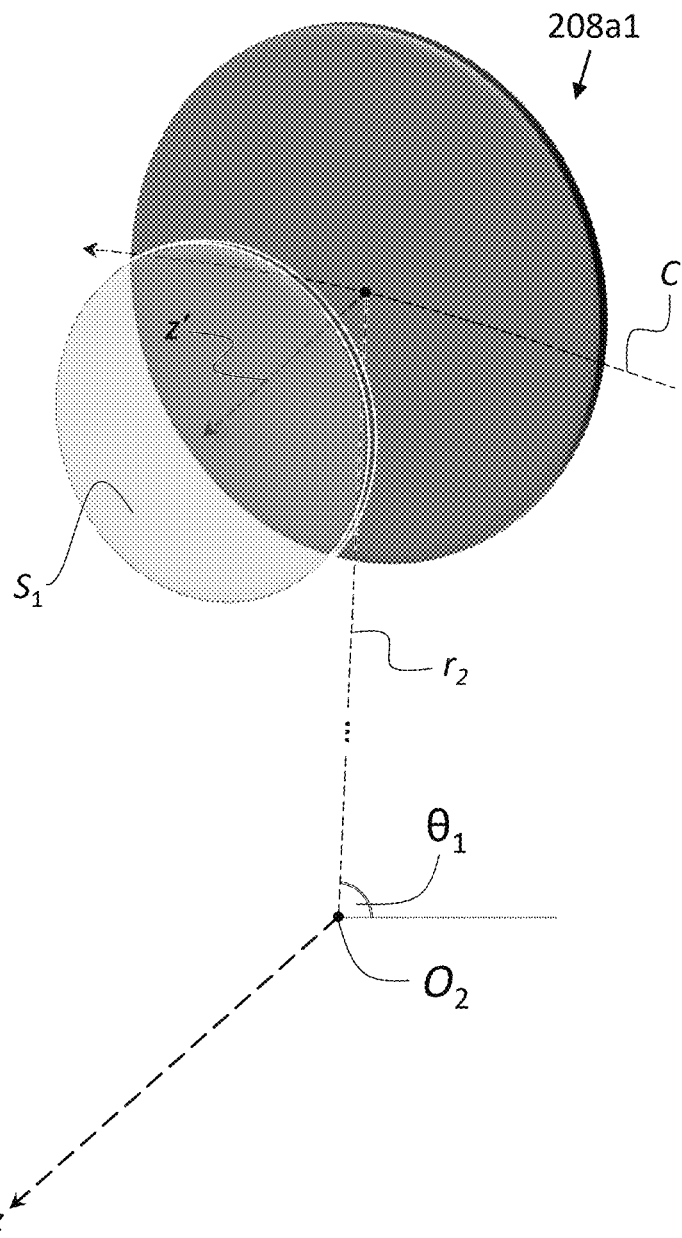

FIGS. 2C-2F schematically depict motion of magnet unit 208a1, and the change to the magnetic field at an azimuth angle $\theta=\theta_1$, as plate 202 is rotated, according to some embodiments. FIG. 2C provides a closeup view of magnet unit 208a1 at a time $t=t_1$, wherein magnet unit 208a1 is rotated to the azimuth angle $\theta_1$. A curve C denotes the trajectory of magnet unit 208a1 due to the rotation of plate 202. Put differently, the curve C delineates an arc of a circle of radius $r_2$. Delineated is a flat, circular area $S_1$ in front of plate front face 214. Area $S_1$ is parallel to plate 202 and is centered about $r=r_2$, $\theta=\theta_1$, and $z=z'$. In FIG. 2C, magnet unit 208a1 is positioned opposite to the area $S_1$ (at a distance z' therefrom).

FIG. 2D-2F schematically depict magnet unit 208a1 at three successive times $t_0$, $t_1$, and $t_2$, respectively, during rotation of plate 202, according to some embodiments. In FIG. 2D (which corresponds to the time $t=t_0=t_1-\Delta t$) magnet unit 208a1 is shown rotated to an azimuth angle $\theta_0=\theta_1-\Delta\theta$. A semi-transparent surface $D_1$ outlines the volume to be occupied by magnet unit 208a1 at the time $t=t_1$ (i.e. when rotated to the azimuth angle $\theta_1$). Also outlined is the circular area $S_1$, as well as a flat, circular area $S_0$, whose positioning relative to magnet unit 208a1 (per the location of magnet unit 208a1 in FIG. 2D) is identical to the positioning of area $S_1$ relative to the surface $D_1$ (or, what amounts to the same thing, the positioning of area $S_1$ relative to magnet unit 208a1 per the location of magnet unit 208a1 in FIG. 2C). Arrows K (not all of which are labelled) indicate a first magnetic field $\vec{H}_{mag}$ formed by magnet unit 208a1 in front of magnet unit 208a1 at the distance z' therefrom (i.e. formed on area $S_0$ when magnet unit 208a1 is rotated to the azimuth angle $\theta_0$).

More specifically, the first magnetic field $\vec{H}_{mag}$ is "attached" to magnet unit 208a1 and travels therewith. A second magnetic field $\vec{H}_{mod}$ on the area $S_1$ changes as plate 202 is rotated. In FIG. 2D the greater part of the contribution to the second magnetic field $\vec{H}_{mod}$ is due to magnet unit 208a1. Arrows $K_1'$ (not all of which are labelled) indicate the second magnetic field $\vec{H}_{mod}$ in FIG. 2D (i.e. the magnetic field formed on the area $S_1$ when magnet unit 208a1 is rotated to the azimuth angle $\theta_0$). The arrows $K_1'$ are shorter than the arrows K reflecting the fact that on the area $S_1$, the magnetic field formed by magnet unit 208a1 is significantly smaller than in front of magnet unit 208a1.

In FIG. 2E (which like FIG. 2C corresponds to the time $t=t_1$) magnet unit 208a1 is shown rotated to the azimuth angle $\theta_1$. A semi-transparent surface $D_0$ outlines the volume previously occupied by magnet unit 208a1 at the time $t=t_0$ (i.e. when rotated to the azimuth angle $\theta_0$). A semi-transparent surface $D_2$ outlines the volume to be occupied by magnet unit 208a1 at the time $t=t_2=t_1+\Delta t$ (i.e. when rotated to the azimuth angle $\theta_2=\theta_1+\Delta\theta$). Also outlined are the circular areas $S_0$ and $S_1$, as well as a flat, circular area $S_2$, whose positioning relative to the surface $D_2$ is identical to the positioning of the area $S_1$ relative to magnet unit 208a1 per the location of magnet unit 208a1 in FIG. 2E (as well as the positioning of the area $S_0$ relative to the surface $D_0$). Arrows $K_0'$ indicate the magnetic field on the area $S_0$ formed substantially by magnet unit 208a1 when magnet unit 208a1 is rotated to the azimuth angle $\theta_1$. In FIG. 2E the second magnetic field $\vec{H}_{mod}$ substantially coincides with, and is substantially equal to, the first magnetic field $\vec{H}_{mag}$ (indicated by the arrows K) with exact equality holding when the contribution to the second magnetic field $\vec{H}_{mod}$ due to the rest of magnet units 208 is neglected. Arrows $K_2'$ indicate the magnetic field on the area $S_2$ formed substantially by magnet unit 208a1 when magnet unit 208a1 is rotated to the azimuth angle $\theta_1$. Both the arrows $K_0'$ and $K_2'$ are shorter than the arrows K reflecting the fact that on the areas $S_0$ and $S_2$ the respective magnetic fields formed by magnet unit 208a1 are significantly smaller than in front of magnet unit 208a1.

In FIG. 2F (which corresponds to the time $t=t_2=t_1+\Delta t$) magnet unit 208a1 is shown rotated at the azimuth angle $\theta_2 = \theta_1 + \Delta\theta$. Also outlined is the surface $D_1$ and the areas $S_1$ and $S_2$. Arrows $K_1''$ (not all of which are labelled) indicate the second magnetic field $\vec{H}_{mod}$ on the area $S_1$ formed substantially by magnet unit $208a1$ when magnet unit $208a1$ is rotated to the azimuth angle $\theta_2$. The arrows $K_1''$ are shorter than the arrows $K$ reflecting the fact that on the area $S_1$, the magnetic field formed by magnet unit $208a1$ is significantly smaller than in front of magnet unit $208a1$.

Also indicated is a curve $C'$. The curve $C'$ is parallel to the curve $C$ and intersects the centers of areas $S_0$, $S_1$, and $S_2$.

According to some embodiments, the first magnetic field $\vec{H}_{mag}$ is about uniform. More precisely, the magnetic field formed by magnet unit $208a1$ may be about uniform over each of a plurality of parallel planes (with the area $S_1$ being defined on the plane located at the distance $z'$ from magnet unit $208a1$) arranged one after the other at increasing distance from magnet unit $208a1$.

Referring again to FIG. 2A, also indicated in are magnet units $208b1$, $208a2$, and $208b2$ (from magnet units $208$). Magnet unit $208b1$ is positioned adjacently, and clockwise relative, to magnet unit $208a1$. Magnet unit $208a2$ is positioned adjacently, and clockwise relative, to magnet unit $208b1$. Magnet unit $208b2$ is positioned adjacently, and clockwise relative, to magnet unit $208a2$.

According to some alternative embodiments, magnet units $208$ include a first subgroup of magnet units and second (additional) subgroup of magnet units. The magnet units from the two subgroups may be alternatingly disposed on plate front face $214$, with the magnet units in the second subgroup having an opposite pole, exposed on plate front face $214$, to that of the magnet units in the first subgroup exposed on plate front face $214$. By way of a non-limiting example, according to some such embodiments, magnet units $208b1$ and $208b2$ may have the south poles thereof exposed on plate front face $214$, while magnet units $208a1$ and $208a2$ may have the north poles thereof exposed on plate front face $214$), and so on. Accordingly, in embodiments wherein the magnitude of the magnetic fields formed by the magnet units in the two subgroups are about identical (so that each of magnet units $208a1$ and $208a2$ forms a magnetic field $\vec{H}_0$ ("first magnetic field" per the terminology of the Summary) in front thereof and each of magnet units $208b1$ and $208b2$ forms a magnetic field $-\vec{H}_0$ ("third magnetic field" per the terminology of the Summary) in front thereof, when plate $202$ is rotated, in front thereof, at any azimuth angle, and at an offset of about $r_2$ relative to the rotational axis $A_2$, the produced magnetic field ("second magnetic field" per the terminology of the Summary) is modulated between $\vec{H}_0$ and $-\vec{H}_0$. The modulation amplitude is thus increased by a factor of about two as compared to when only one pole (e.g. the north pole) is exposed on plate front face $214$.

FIG. 3A schematically depicts a magnetic field generating device $300$, which corresponds to specific embodiments of device $100$. Device $300$ includes a plate $302$, motor $104$, magnet units $308$ (not all of which are numbered), and, optionally, displacement infrastructure $130$. Plate $302$ and magnet units $308$ correspond to specific embodiments of plate $102$ and magnet units $108$, respectively. Also indicated are a plate back face $312$ and a plate front face $314$.

Each of magnet units $308$ is offset by about $r_3$ relative to a rotational axis $A_3$, about which plate $302$ is configured to be rotated. Also indicated is an origin $O_3$ whereat the rotational axis $A_3$ intersects plate front face $314$. Magnet units $308$ include first (permanent) magnets $334a$ (not all of which are numbered) and second (permanent) magnets $334b$ (not all of which are numbered), respectively. More precisely, each of magnet units $308$ includes one of first magnets $334a$ and one of second magnets $334b$. Second magnets $334b$ are of opposite polarity to first magnets $334a$, such that if, for example, first magnets $334a$ have the south poles thereof exposed on plate front face $314$, second magnets $334b$ have the north poles thereof exposed on plate front face $314$. Second magnets $334b$ may be of about the same strength as first magnets $334a$. Each of second magnets $334b$ may be disposed adjacently to the respective first magnet. Accordingly, in front of each of magnet units $308$ a first magnetic field, which points in parallel to plate front face $314$ from the second magnet to the first magnet, is formed. As plate $302$ is rotated, at any given azimuth, and at an offset of $r_3$ relative to the rotational axis $A_3$, there is produced a second magnetic field, which is modulated between about zero and the first magnetic field.

Magnet units $308$ may be about symmetrically disposed about the rotational axis $A_3$, such that about the same angle is subtended between each pair of adjacent magnet units, and such that each of magnet units $308$ is likewise oriented relative to the rotational axis $A_3$. Thus, for example, magnet unit $308'$ and a magnet unit $308''$, which are displaced relative to the origin $O_3$ by a vector $\vec{r}'$ and a vector $\vec{r}''$, respectively, are oriented at about a same angle (e.g. right angles) relative to the vector $\vec{r}'$ and the vector $\vec{r}''$, respectively. $|\vec{r}'| \cong |\vec{r}''| \cong r_3$. In particular, a first magnet $334a''$ (from first magnets $334a$) orientation relative to the vector $\vec{r}''$ is about the same as a first magnet $334a'$ (from first magnets $334a$) orientation relative to the vector $\vec{r}'$, and a second magnet $334b''$ (from second magnets $334b$) orientation relative to the vector $\vec{r}''$ is about the same as a second magnet $334b'$ (from second magnets $334b$) orientation relative to the vector $\vec{r}'$.

Referring also to FIG. 3B, FIG. 3B provides an enlarged view magnet unit $308'$, according to some embodiments. As a non-limiting example, each of first magnet $334a'$ and second magnet $334b'$ is oriented perpendicularly to the vector the vector $\vec{r}'$ with second magnet $334b'$, which has a north pole thereof exposed on plate front face $314$, being positioned further from the origin $O_3$ than first magnet $334a'$, which has a south pole thereof exposed on plate front face $314$. Accordingly, in front of magnet unit $308'$, the magnetic field formed thereby points towards the origin $O_3$ (i.e. opposite to the vector $\vec{r}'$).

While in FIG. 3A device $300$ is depicted as including a plurality of magnet units (i.e. magnet units $308$), according to some alternative embodiments, not depicted in FIG. 3A, device $300$ may include a single magnet unit (e.g. magnet unit $308'$).

Figure 3C:
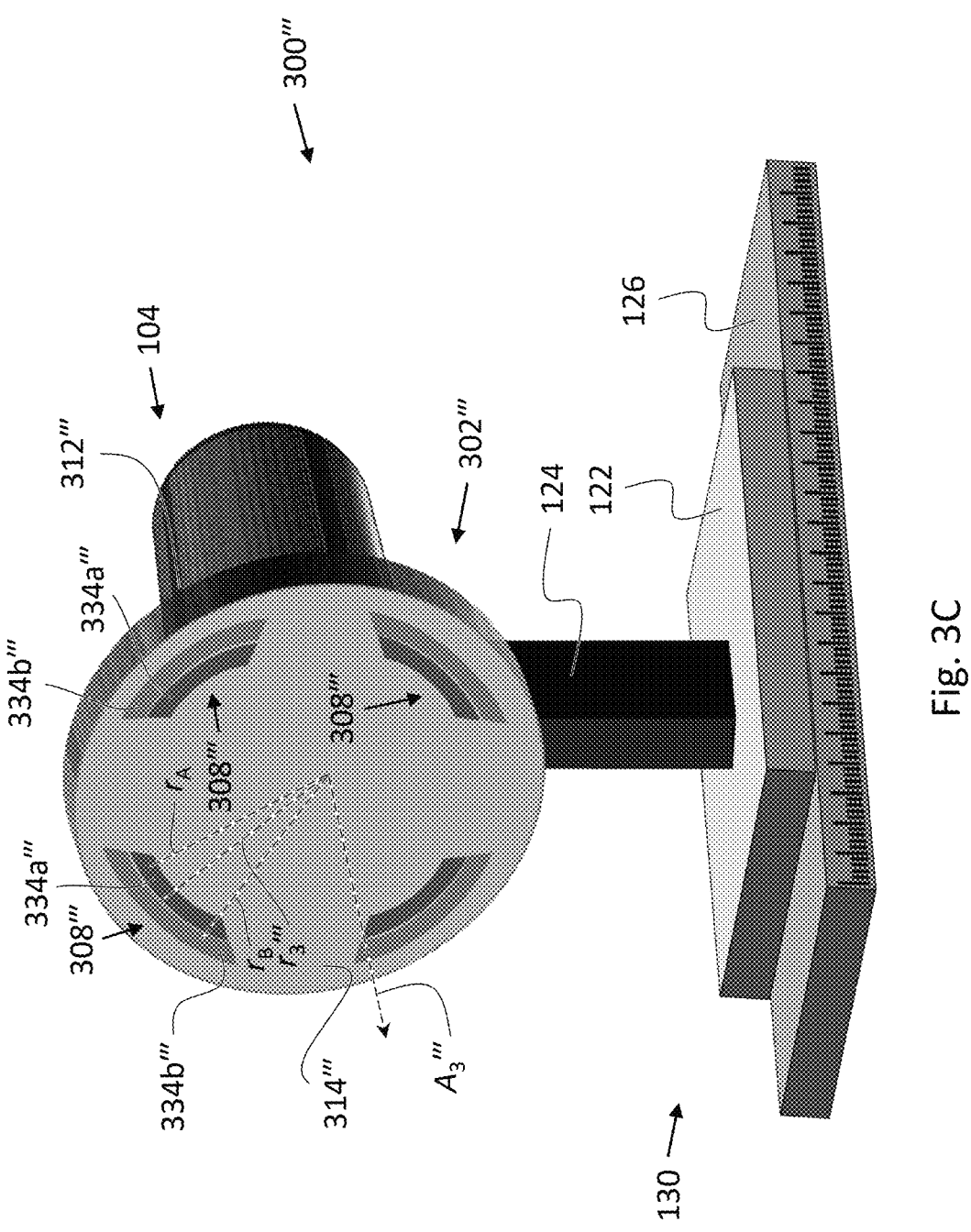
FIG. 3C schematically depicts a magnetic field generating device corresponding to specific embodiments of the device of FIG. 3A.

FIG. 3C schematically depicts a magnetic field generating device $300'''$, which corresponds to specific embodiments of device $300$, wherein lateral (i.e. in parallel to the plate) cross-sections of the magnet units (including exposed surfaces thereof) are arc shaped. More specifically, device $300'''$ includes a plate $302'''$, motor $104$, magnet units $308'''$ (not all of which are numbered), and, optionally, displacement infrastructure $130$. Plate $302'''$ and magnet units $308'''$ correspond to specific embodiments of plate $302$ and magnet units $308$, respectively. Magnet units $308'''$ include first magnets $334a'''$ and second magnets $334b'''$, respectively. First magnets $334a'''$ correspond to specific embodiments of first magnets 334a. Second magnets 334b''' correspond to specific embodiments of second magnets 334b. Also indicated are a plate back face 312''' and a plate front face 314''', which correspond to specific embodiments of plate back face 312 and plate front face 314, respectively.

Each of magnet units 308''' is offset by about $r_3$''' relative to a rotational axis $A_3$''' about which plate 302''' is configured to be rotated. Each of first magnets 334a''' is offset by a distance $r_A < r_3$''' relative to the rotational axis $A_3$''' and defines an arc of a circle of radius $r_A$. Each of second magnets 334b''' is offset by a distance $r_B > r_3$' relative to the rotational axis $A_3$''' and defines an arc of a circle of radius $r_B$. Accordingly, when the strengths of first magnets 334a''' and second magnets 334b''' are about identical, the combined magnetic field produced by each adjacent first magnet-second magnet pair is about uniform in magnitude in front of the magnet unit at a distance of about $r_3$''' from the rotational axis $A_3$''' and points towards the rotational axis $A_3$'''. (That is, the magnetic field is about uniform in magnitude over each of a plurality of arc-shaped strips arranged one after the other at increasing distance from the magnet unit.)

Accordingly, when the angles subtended by the arcs are sufficiently large (with comparable angles subtended between the near edges of adjacent arcs) a substantially on/off square modulation profile is achieved, since (under uniform rotation) the time in which the magnetic field (produced at any location near plate 302''', in front thereof, and offset by $r_3$''' relative to the rotational axis $A_3$''') transitions from about zero to about maximum strength is much shorter than the time during which the magnetic field is at about zero and the time during which the magnetic field is at about maximum strength.

Figure 4A:
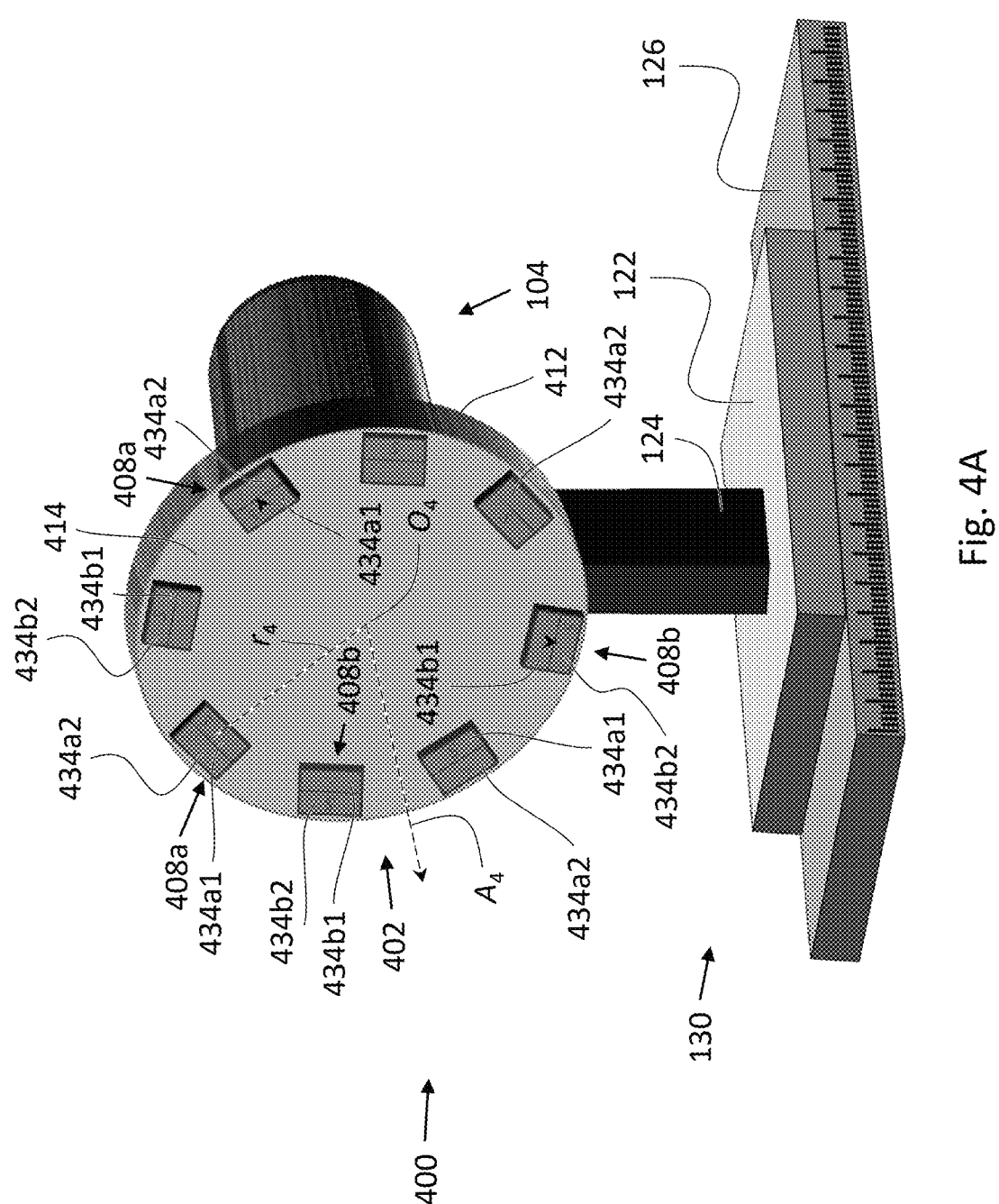
FIG. 4A schematically depicts a magnetic field generating device corresponding to specific embodiments of the device of FIG. 1A, wherein each of the magnet units includes a pair of permanent magnets of opposite polarity and the magnet units are anti-symmetrically arranged.

FIG. 4A schematically depicts a magnetic field generating device 400, which corresponds to specific embodiments of device 100. Device 400 includes a plate 402, motor 104, magnet units 408, and, optionally, displacement infrastructure 130. Plate 402 corresponds to specific embodiments of plate 102. Magnet units 408 include magnet units 408a and (additional) magnet units 408b ("additional magnet units" per the terminology of the Summary; not all of which are numbered). Magnet units 408a and 408b jointly correspond to specific embodiments of magnet units 108. Also indicated are a plate back face 412 and a plate front face 414.

Each of magnet units 408a and magnet units 408b is offset by about $r_4$ relative to a rotational axis $A_4$ about which plate 402 is configured to be rotated. Also indicated is an origin $O_4$ whereat the rotational axis $A_4$ intersects plate front face 414. Magnet units 408a include first (permanent) magnets 434a1 (not all of which are numbered) and second (permanent) magnets 434a2 (not all of which are numbered), respectively. Second magnets 434a2 are of opposite polarity to first magnets 434a1 and of about the same strength. Each of second magnets 434a2 may be disposed adjacently to the respective first magnet. Accordingly, in front of each of magnet units 408a a magnetic field ("first magnetic field" per the terminology of the Summary), which points in parallel to plate front face 314 from the second magnet to the first magnet, is formed. Magnet units 408a may be about symmetrically disposed about the rotational axis $A_4$, such that about the same angle is subtended between each pair of adjacent magnet units (from magnet units 408a), and such that each of magnet units 408a is likewise oriented relative to the rotational axis $A_4$.

Magnet units 408b include first (permanent) magnets 434b1 (not all of which are numbered) and second (permanent) magnets 434b2 (not all of which are numbered), respectively. Second magnets 434b2 are of opposite polarity to first magnets 434b1 and of about same strength. First magnets 434b1 are of different strength than first magnets 434a1 and, optionally, opposite polarity. Each of second magnets 434b2 may be disposed adjacently to the respective first magnet. Accordingly, in front of each of magnet units 408b a magnetic field ("third magnetic field" per the terminology of the Summary), which points in parallel to plate front face 414 from the second magnet to the first magnet, is formed. Magnet units 408b may be about symmetrically disposed about the rotational axis $A_4$, such that about the same angle is subtended between each pair of adjacent magnet units (from magnet units 408b), and such that each of magnet units 408b is likewise oriented relative to the rotational axis $A_4$.

Magnet units 408a and magnet units 408b are alternatingly mounted on plate front face 414. As plate 402 is rotated, at any given azimuth, and at an offset of $r_4$ relative to the rotational axis $A_3$, there is produced a magnetic field ("second magnetic field" per the terminology of the Summary), which is modulated between about the first magnetic field (formed by each magnet units 408a) and the third magnetic field (formed by each of magnet units 408b).

According to some embodiments, each of magnet units 408b may be positioned about equidistantly between a respective pair of magnet units from magnet units 408a. Accordingly, when plate 402 is rotated, in front thereof, at any azimuth angle, and at an offset of about $r_4$ relative to the rotational axis $A_4$, the (second) magnetic field is modulated between two magnetic fields: a (first) magnetic field formed by each of magnet units 408a in front thereof and a (third) magnetic field formed by each of magnet units 408b in front thereof. According to some embodiments, wherein (i) each of first magnets 434b1 forms in front thereof a magnetic field, which is about equal to minus the magnetic field formed by each of first magnets 434a1 in front thereof, and (ii) each of second magnets 434b2 forms in front thereof a magnetic field, which is about equal to minus the magnetic field formed by each of second magnets 434a2 in front thereof, when plate 402 is rotated, in front thereof, at any azimuth angle, and at an offset of about $r_4$ relative to the rotational axis $A_4$, the magnetic field is modulated between two opposite magnetic fields. According to some such embodiments, wherein the strengths of magnets 434a1, 434a2, 434b1, and 434b2 are about equal, when plate 402 is rotated, in front thereof, at any azimuth angle, and at an offset of about $r_4$ relative to the rotational axis $A_4$, the magnetic field is modulated between two magnetic fields: a magnetic field pointing towards the origin $O_4$ and a magnetic field of equal magnitude pointing away from the origin $O_4$.

Figure 4B:
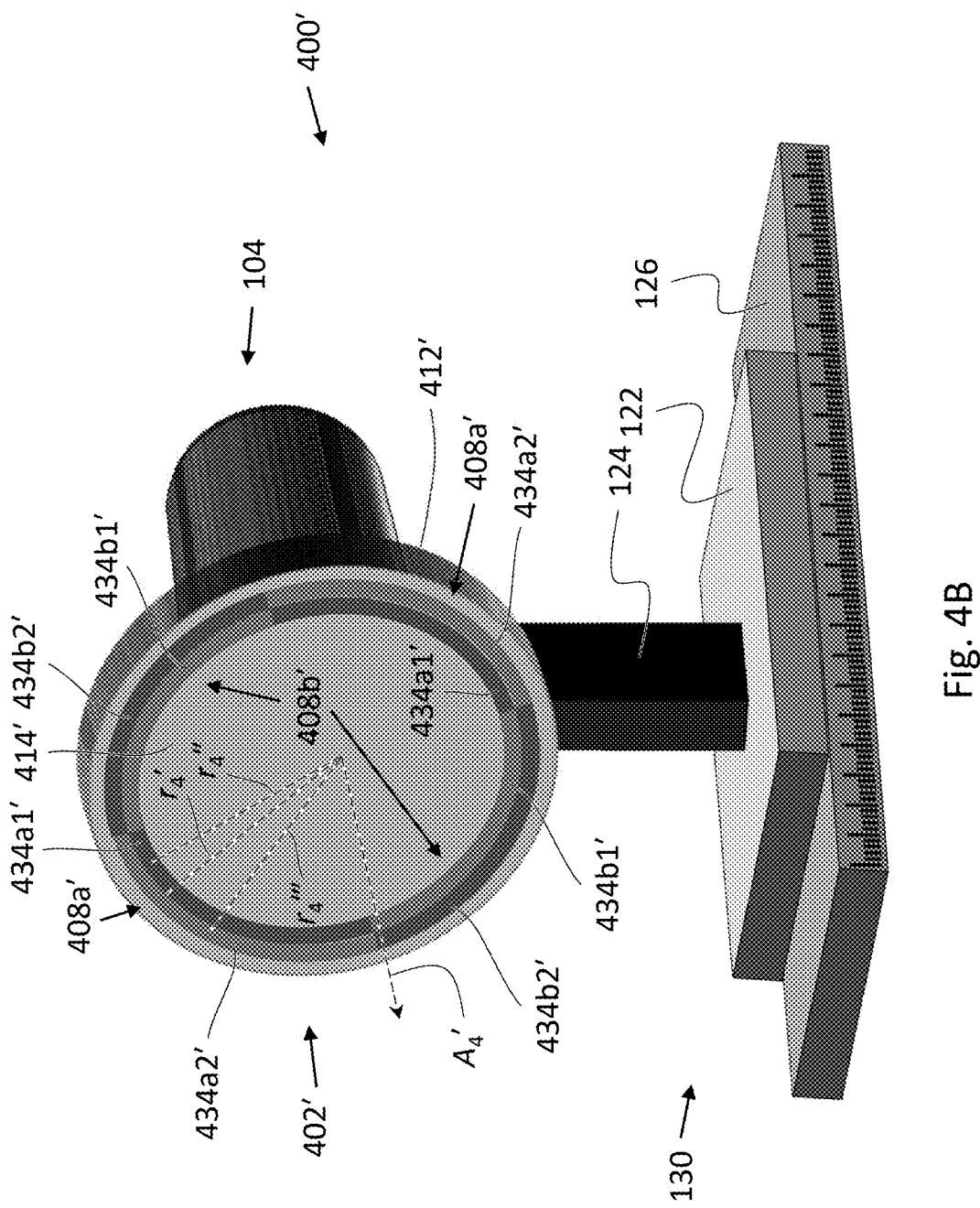
FIG. 4B schematically depicts a magnetic field generating device corresponding to specific embodiments of the device of FIG. 4A.

FIG. 4B schematically depicts a magnetic field generating device 400', which corresponds to specific embodiments of device 400, wherein lateral (i.e. in parallel to the plate) cross-sections of the magnet units (including exposed surfaces thereof) are arc shaped. More specifically, device 400' includes a plate 402', motor 104, magnet units 408a' and (additional) magnet units 408b', and, optionally, displacement infrastructure 130. Plate 402', magnet units 408a', and magnet units 408b' correspond to specific embodiments of plate 402, magnet units 408a, and magnet units 408b, respectively. Magnet units 408a' include first magnets 434a1' and second magnets 434a2', respectively. First magnets 434a1' correspond to specific embodiments of first magnets 434a1. Second magnets 434a2' correspond to specific embodiments of second magnets 434a2. Magnet units 408b' include first magnets 434b1' and second magnets 434b2', respectively. First magnets 434b1' correspond to specific embodiments of first magnets 434b1. Second magnets 434b2' correspond to specific embodiments of second magnets 434b2. Also indicated are a plate back face 412' and a plate front face 414', which correspond to specific embodiments of plate back face 412 and plate front face 414, respectively.

Each of magnet units 408a' and 408b' is offset by about $r_4'$ relative to a rotational axis $A_4'$, about which plate 402' is configured to be rotated. Each of first magnets 434a1' and 434b1' is offset by a distance $r_4''<r_4'$ relative to the rotational axis $A_4'$ and defines an arc of a circle of radius $r_4''$. Each of second magnets 434a2' and 434b2' is offset by a distance $r_4'''>r_4'$ relative to the rotational axis $A_4'$ and defines an arc of a circle of radius $r_4'''$. First magnets 434b1' are of opposite polarity to first magnets 434a1' (and second magnets 434b2' are of opposite polarity to second magnets 434a2'). Accordingly, when the strengths of first magnets 434a1' and second magnets 434a2' are about identical, the combined magnetic field produced by each of magnet units 408a' is about uniform in magnitude in front of the magnet unit at a distance of about $r_4'$ from the rotational axis $A_4'$ and points towards the rotational axis $A_4'$. Similarly, when the strengths of first magnets 434b1' and second magnets 434b2' are about identical, the combined magnetic field produced by each of magnet units 408b' is about uniform in magnitude in front of the magnet unit at a distance of about $r_4'$ from the rotational axis $A_4'$ and points away from the rotational axis $A_4'$.

According to some embodiments, and as depicted in FIG. 4B, magnet units 408a' and 408b' are arranged contiguously. Accordingly, when the angles subtended by the arcs are sufficiently large, a substantially square modulation profile is achieved in which the magnetic field (produced at any location near plate 402', in front thereof, and offset by $r_4'$ relative to the rotational axis $A_4'$) flips sign.

Systems for Magnetic Testing of Samples

Figure 5:
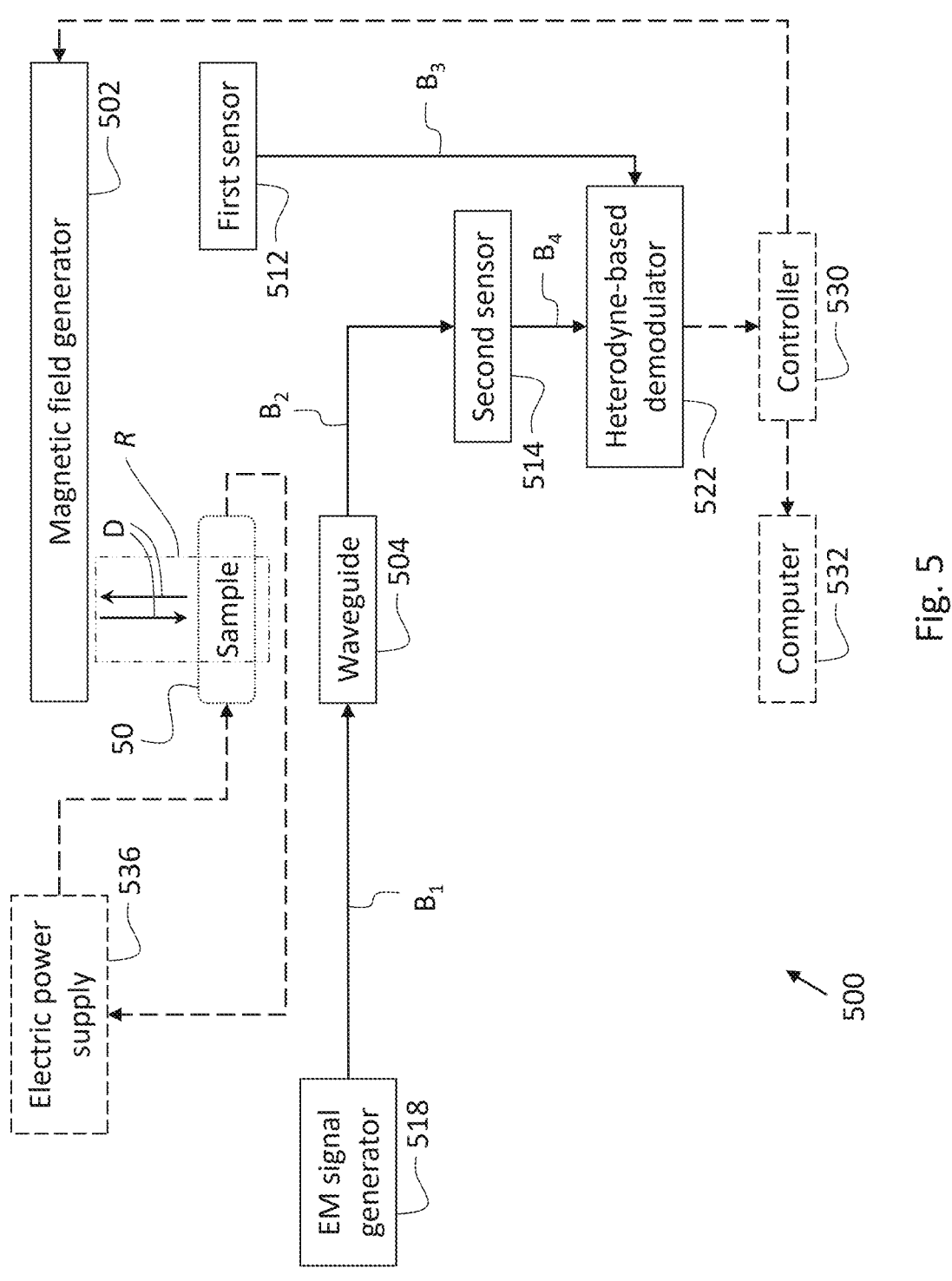
FIG. 5 is a block diagram for magnetic testing of samples, according to some embodiments.

According to an aspect of some embodiments, there is provided a system for magnetic testing of samples. FIG. 5 is a block diagram of such a system: a system 500. According to some embodiments, system 500 includes a magnetic field generator 502, a waveguide 504, a first sensor 512, a second sensor 514, an electromagnetic (EM) signal generator 518, and a heterodyne-based demodulator 522.

Magnetic field generator 502 is configured to produce a temporally modulated magnetic field over a region R (delineated by a dashed-double-dotted line) whereat a sample 50, which is to be tested, is positioned. According to some embodiments, wherein sample 50 is in the form of a bulk, sample 50 may be held by a sample holder (not shown). According to some embodiments, sample 50 may constitute an exposed structure forming part of a larger structure. According to some embodiments, sample 50 is, or is included in, a magnetic memory device during one of the fabrication stages thereof. According to some such embodiments, sample 50 may be or include a thin film, which includes a metallic material and/or a magnetic (and/or magnetizable) material and which is exposed on the magnetic memory device in one of the fabrication stages thereof. According to some embodiments, the thin film may be multilayer, for example, including a non-magnetic metallic layer (e.g. platinum, tungsten, tantalum) and a magnetic layer (e.g. permalloy, cobalt, nickel, CoFeB (alloy of cobalt-iron-boron), gadolinium) disposed on the metallic layer externally thereto (e.g. when the thin film is positioned on a substrate, the metallic layer is positioned between the substrate and the magnetic layer and the sample will be positioned such that the magnetic layer is adjacent to waveguide, in particular, the magnetic layer is closer to waveguide than the metallic layer and the substrate). According to some such embodiments, the thin film may constitute the current top layer of a wafer, or a part of the current top layer of the wafer in a preliminary or intermediate stage of production of the wafer with the magnetic layer disposed externally to the metallic layer. (The magnetic layer may be coated by a cap layer, such as TaN (tantalum nitride alloy) to prevent oxidation.) According to some embodiments, the magnetic layer may serve as a "probe", which facilitates using FMR techniques to measure spin currents produced in the metallic layer by passing an electric current through the metallic layer. According to some such embodiments, the magnetic layer may be removed following the measurement (assuming the metallic layer "passed" the inspection). According to some embodiments, the magnetic memory device may be a magnetic tunnel junction (MTJ), a spin-transfer torque magnetoresistive random-access memory (STT-MRAM), or a spin-orbit torque magnetoresistive random-access memory (SOT-MRAM). According to some embodiments, the magnetic memory device may be a spin valve.

According to some embodiments, the thin film may be a few atoms thick (e.g. as low as about one to two nanometers in thickness).

According to some alternative embodiments, sample 50 may be constituted by a material in the form of liquid drops applied on waveguide 504 or a powder scattered on waveguide 504. According to some such embodiments, the material includes free radicals.

Figure 6A:
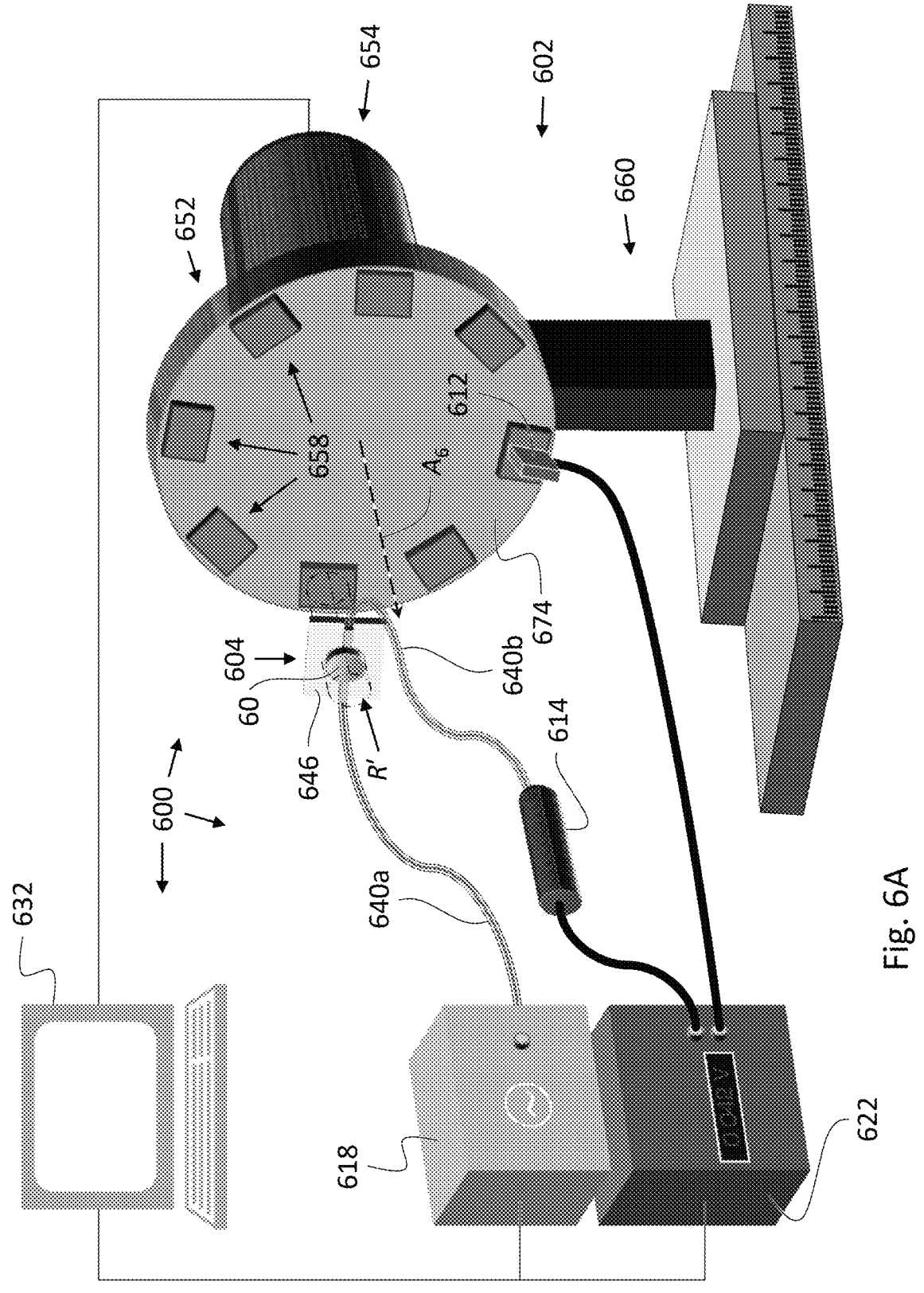
FIG. 6A schematically depicts a system for magnetic testing of samples corresponding to specific embodiments of the system of FIG. 5.
Figure 7A:
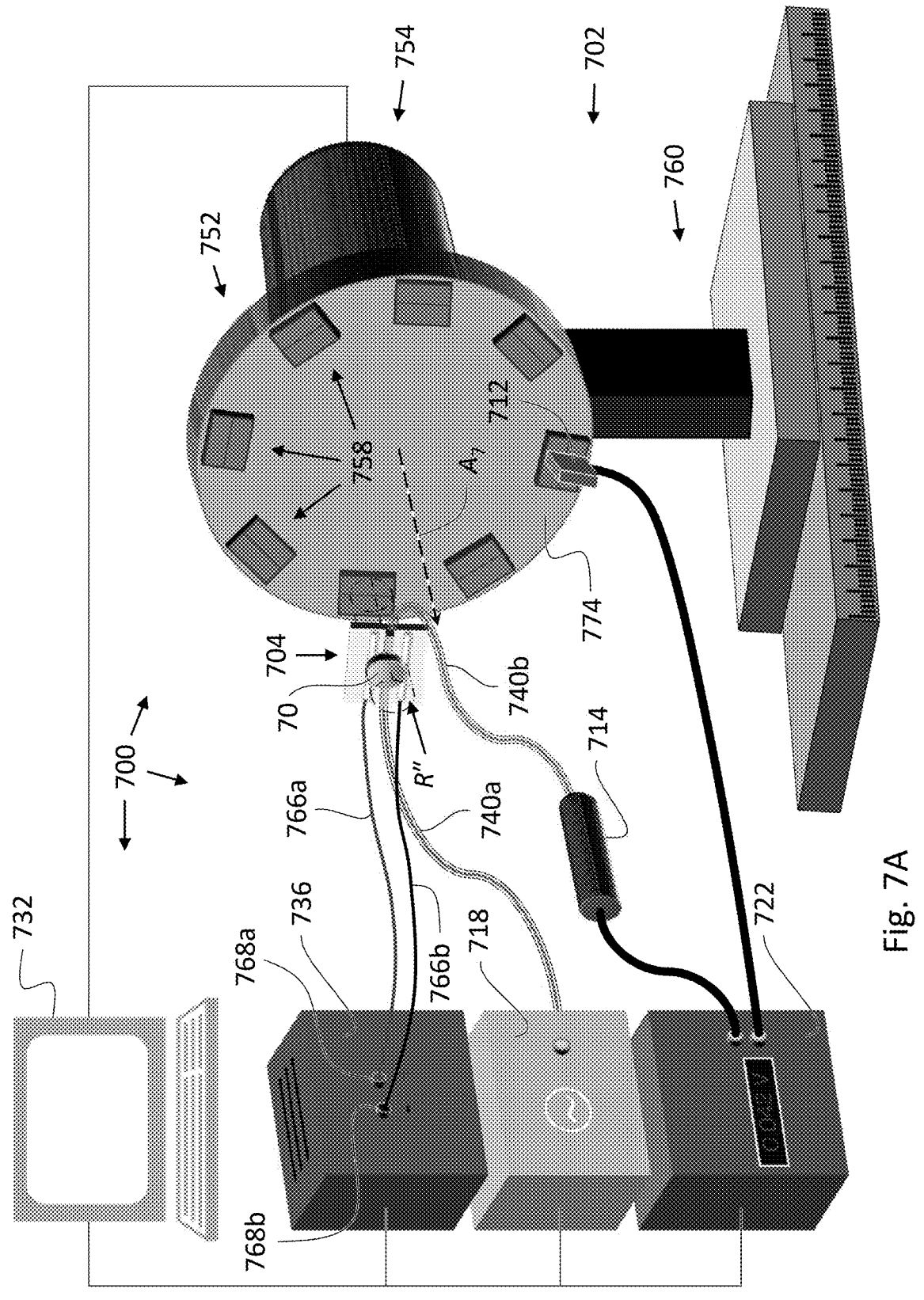
FIG. 7A schematically depicts a system for testing of magnetic samples corresponding to specific embodiments of the system of FIG. 5.

According to some embodiments, and as depicted in FIGS. 6A and 7A, magnetic field generator 502 may be configured to produce the temporally modulated magnetic field by rotating at least one magnet (included in magnetic field generator 502), which is permanent. According to some alternative embodiments, and as elaborated on below, magnetic field generator 502 may be configured to produce the temporally modulated magnetic field by alternately magnetically shielding and unshielding at least one permanent magnet and/or at least one temporary magnet (e.g. an electromagnet).

According to some embodiments, the modulation profile of the produced magnetic field is substantially an on/off square modulation profile. According to some embodiments, the modulation profile of the produced magnetic field is about sinusoidal. According to some embodiments, the modulation profile of the produced magnetic field is pulsed. According to some embodiments, magnetic field generator 502 may be magnetic field generating device 100, or any one of the specific embodiments thereof, i.e. magnetic field generating devices 100', 200, 300, 300''', 400, and 400'.

According to some embodiments, sample 50 may be or include a ferromagnetic material, a ferrimagnetic material, an anti-ferromagnetic material, and/or a paramagnetic material.

It will be understood that sample 50 is not included in system 500.

First sensor 512 is configured to obtain a first signal by directly and/or indirectly measuring a modulation rate of the magnetic field produced by magnetic field generator 502. In the former case, and as depicted in FIGS. 6A and 7A according to some embodiments thereof, the produced magnetic field may be measured (so that the full modulation profile is measured). In the latter case, the modulation rate may be deduced through optical measurements (e.g. essentially as described above with respect to FIG. 1B or in a similar manner thereto).

According to some embodiments, wherein the produced magnetic field is measured (i.e. the modulation rate is directly measured), first sensor 512 may be, for example, a Hall sensor, a mechanical magnetic switch, or a magnetic pickup coil with an electric amplifier. According to some embodiments, wherein the modulation rate is indirectly measured, first sensor 512 may be, for example, a photodetector used in conjunction with a laser beam generator (which may also be included system 500; not shown), or first sensor 512 may be, for example, an opto-coupler (i.e. an opto-isolator) or a slotted opto-coupler track sensor.

Waveguide 504 is positioned adjacently to the sample. Waveguide 504 is coupled on a first end thereof to EM signal generator 518 and on a second end thereof to second sensor 514. EM signal generator 518 is configured to transmit an EM signal (i.e. an EM wave; indicated by a first arrow $B_1$) into waveguide 504. A transmitted portion (indicated by a second arrows $B_2$) of the EM signal exits waveguide 504 via the second end thereof. According to some embodiments, the EM signal may be mono-frequency (i.e. including a single frequency). Second sensor 514 is configured to obtain a measured signal by measuring over a time interval, which spans multiple rotation cycles of the at least one magnet, the instantaneous power of the transmitted portion. According to some alternative embodiments, and as elaborated on below, waveguide 504 may be a resonant cavity (e.g. a microwave resonant cavity).

Heterodyne-based demodulator 522 is configured to receive a reference signal. The reference signal may be constituted by the first signal in embodiments wherein the modulation rate is directly measured. In particular, according to some embodiments, wherein the modulation rate is directly measured, and as depicted in FIG. 5, heterodyne-based demodulator 522 may be communicatively associated with first sensor 512 and configured to receive therefrom the reference signal (indicated by a third arrow $B_3$).

According to some alternative embodiments, wherein the modulation rate is indirectly measured, the first signal may be "raw", so that some processing may be required to obtain the reference signal therefrom. According to some embodiments, the processing may be performed by heterodyne-based demodulator 522. Alternatively, according to some embodiments, the first signal may be relayed to computer hardware 532 (described below), which derives therefrom the reference signal (which is then sent to heterodyne-based demodulator 522).

Heterodyne-based demodulator 522 may be further communicatively associated with second sensor 514 and configured to receive therefrom the measured signal (indicated by a fourth arrow $B_4$).

Heterodyne-based demodulator 522 is configured to use the reference signal to demodulate the measured signal. That is, heterodyne-based demodulator 522 is configured to use the reference signal to extract the envelope of the measured signal, or, more precisely, the Fourier coefficient of the measured signal corresponding to the modulation rate (i.e. the Fourier coefficient corresponding to the fundamental frequency). According to some embodiments, heterodyne-based demodulator 522 may be configured to additionally extract from the reference signal higher harmonics (beyond the fundamental frequency) which characterizing the modulation profile. According to some embodiments, heterodyne-based demodulator 522 may be a lock-in amplifier.

According to some embodiments, EM signal generator 518 is configured to generate EM signals (e.g. mono-frequency EM signals) in the radiofrequency (RF) range, and second sensor 514 is or includes an RF power detector (e.g. an RF diode detector). According to some such embodiments, waveguide 504 may be a planar transmission line selected from a microstrip (i.e. a microstrip RF waveguide; also termed "microstrip line"), a coplanar waveguide, a stripline (if allowing sufficient leakage of EM radiation outside the stripline), and the like.

According to some embodiments, system 500 further includes displacement infrastructure (not shown in FIG. 5). The displacement infrastructure may include a motor (not shown), such as a stepper motor, and is configured to allow controllably varying (as indicated by arrows D) a distance between magnetic field generator 502 and sample 50, and thereby commensurately vary the maximum strength of the produced magnetic field to which sample 50 is subjected. Put differently, by varying the distance between magnetic field generator 502 and sample 50 the modulation amplitude of the produced magnetic field, whereat sample 50 is located, is varied.

According to some embodiments, the displacement infrastructure may be configured to allow controllably translating magnetic field generator 502, and thereby vary the distance between magnetic field generator 502 and sample 50. According to some embodiments, the displacement infrastructure may be configured to allow controllably translating sample 50, and, optionally, waveguide 504 (together with sample 50), and thereby vary the distance between magnetic field generator 502 and sample 50. According to some embodiments, the displacement infrastructure may be configured to allow selectively and controllably translating each of magnetic field generator 502 and sample 50 (and, optionally, waveguide 504).

According to some embodiments, system 500 further includes a controller 530 communicatively associated with at least the displacement infrastructure and the magnetic field generator 502. Controller 530 may be configured to command the displacement infrastructure to vary the distance (slowly and continuously or in increments) between magnetic field generator 502 and sample 50 (and thereby commensurately vary the modulation amplitude of the produced magnetic field). Controller 530 may be further configured to command EM signal generator 518 to vary a frequency of the EM signal (and thereby change the value of the magnetic field for which resonance (maximum absorption) will be attained). In particular, according to some embodiments, controller 530 may be configured to command displacement infrastructure to vary the distance between magnetic field generator 502 and sample 50 such that, for at least some of the frequencies of the EM signals, an interaction between EM radiation leaked out of the waveguide and spins in the sample reaches resonance (e.g. ferromagnetic resonance when sample 50 includes a magnetic thin film). When the distance between magnetic field generator 502 and sample 50 is varied in increments, for each combination of the modulation amplitude and EM signal frequency (i.e. frequency of the EM signal) a respective measured signal is obtained by second sensor 514, which is then demodulated by heterodyne-based demodulator 522, thereby obtaining a respective demodulated signal, or, more precisely, the Fourier coefficient corresponding to the fundamental frequency of the measured signal. When the distance between magnetic field generator 502 and sample 50 is varied continuously, for each frequency of the EM signal a respective measured signal is obtained by second sensor 514, which is then demodulated by heterodyne-based demodulator 522, thereby obtaining a respective demodulated signal or, more precisely, the Fourier coefficient, which corresponds to the fundamental frequency of the measured signal, as a function of the modulation amplitude of the produced magnetic field (or, equivalently, the distance between magnetic field generator 502 ad sample 50).

The term "demodulated signal" is to be understood as encompassing both (i) a single value—the Fourier coefficient corresponding to a specific combination of the magnetic field modulation amplitude and EM signal frequency (e.g. when the distance between magnetic field generator 502 and sample 50 is varied in increments)—and (ii) a continuous signal—the Fourier coefficient corresponding to a specific EM signal frequency as a function of the magnetic field modulation amplitude (e.g. when the distance between magnetic field generator 502 and sample 50 is varied continuously).

According to some embodiments, system 500 further includes computer hardware 532, which includes one or more processors and, optionally, RAM and/or non-volatile memory components associated with the one or more processors (not shown). Computer hardware 532 may be configured to receive (e.g. relayed via controller 530) the demodulated signals, and, based thereon, compute one or more sample parameters parameterizing one or more properties of sample 50. More precisely, the one or more processors may be configured to execute software instructions, which are stored in the non-volatile memory components. Through execution of the software instructions, the demodulated signals are processed to obtain (values of) the one or more sample parameters. More specifically, according to some embodiments, as an intermediate step to obtaining the one or more sample parameters, computer hardware 532 may be configured to process the demodulated signals to extract, for each of the frequencies of the EM signals, respective one or more spectral parameters characterizing a respective absorption spectrum (i.e. the amount of EM radiation absorbed as a function of the amplitude of the applied magnetic field). According to some embodiments, the one or more spectral parameters may include one or more parameters characterizing an absorption peak (corresponding to a resonance) of the absorption spectrum, such as the linewidth of the absorption peak (e.g. the width of the absorption peak at half-peak height, which is also referred to as the "resonance linewidth"), the lateral location of the resonance peak (i.e. the value of the amplitude of the magnetic field for which the resonance is obtained), and/or the height of the absorption peak.

According to some embodiments, the one or more properties of sample 50 include one or more of a magnetization saturation, a Gilbert damping, an effective anisotropy, a magnetic inhomogeneity, a gyromagnetic ratio, a g-factor, and one or more resonance linewidths (corresponding to one or more frequencies of the EM signals, respectively). (Out of this list, in the context of ESR, the g-factor and the resonance linewidths are of especial interest.) In particular, according to some embodiments, as an intermediate step in obtaining some of the above sample parameters, computer hardware 532 may be configured to extract from the obtained absorption spectra a dependence of the resonance frequency on the resonance magnitude of the applied magnetic field (that is, the magnitude of the applied magnetic field at which the absorption is maximum). To this end, according to some embodiments, and as elaborated on below in the Experimental results subsection in the description of FIG. 10E, computer hardware 532 may be configured to fit Kittel's formula $$f_{res} = \gamma \frac{\mu_0}{4\pi} \cdot \sqrt{H_{res} \cdot 1 (H_{res} + M_s)}$$

to the spectral data by optimizing over $\gamma$ (the gyromagnetic ratio) and $M_s$ (the magnetization saturation), and thereby extract the values of the gyromagnetic ratio and the magnetization saturation of sample 50.

According to some embodiments, computer hardware 532 may be configured to obtain the dependence of $\Delta H_{1/2}$—the linewidth at half-peak height (the resonance linewidth)—on the frequency f of the EM signal (transmitted into waveguide 504). To this end, according to some embodiments, and elaborated on below in the Experimental results subsection in the description of FIG. 10F, computer hardware 532 may be configured to linearly fit the (f, $\Delta H^{(f)}_{1/2}$) pairs (for each EM signal frequency f, $\Delta H^{(f)}_{1/2}$ is extracted from the respectively obtained absorption spectrum). Computer hardware 532 may be configured to extract the value of the Gilbert damping coefficient $\alpha$ from the slope of the fitted linear curve. More precisely, computer hardware 532 may be configured to extract the value a using the relation $\alpha = A_c \cdot \gamma \cdot \Delta H_{1/2}/(4\pi \cdot f)$ (discounting a marginal offset of the linear curve relative to the origin). The value of the gyromagnetic ratio $\gamma$ may be obtained as described above. As explained in detail in the Experimental results subsection, $A_c$ is a factor accounting for the broadening of the absorption peak relative to that of an exact Lorentzian e.g. when the modulation profile is sinusoidal. (When the modulation profile is an on/off square modulation profile, the absorption peak is essentially Lorentzian.) More precisely, for each modulation profile, $A_c$ may be computed via $$A_c = \langle \Delta H_L^{(f)} / \Delta H_{MP}^{(f)} \rangle_f.$$

The subscripts MP and L stand for "modulation profile" and Lorentzian, respectively. For each EM signal frequency f, $$\Delta H_{MP}^{(f)}$$

is the extracted width at half-peak height of the respective absorption peak, while is the width at half-peak height of a respective Lorentzian absorption peak (which may obtained through modelling or through measurement using an on/off square modulation profile of the applied magnetic field). The square brackets denote averaging with respect to f, though, in principle, the ratio should be independent of f.

According to some embodiments, controller 530 may be included in computer hardware 532 (e.g. in a computer constituted by computer hardware 532). In particular, according to some such embodiments, controller 530 is included in the one or more processors of computer hardware 532 (i.e. the above-described functions of controller 530 are implemented by the one or more processors).

According to some embodiments, particularly embodiments wherein sample 50 is or includes a thin film, for example, embodiments wherein sample 50 is or includes a multilayer film (e.g. a bilayer film) including a non-magnetic metallic layer and a magnetic layer, system 50 may further include a first conductive interface (e.g. a first lead; not shown) and a second conductive interface (e.g. a second lead; not shown). The first conductive interface and the second conductive interface are coupled to a first terminal and a second terminal, respectively, of an electric power supply 536, and are configured to each contact the thin film so as to allow passing an electric current therethrough.

Figure 7B:
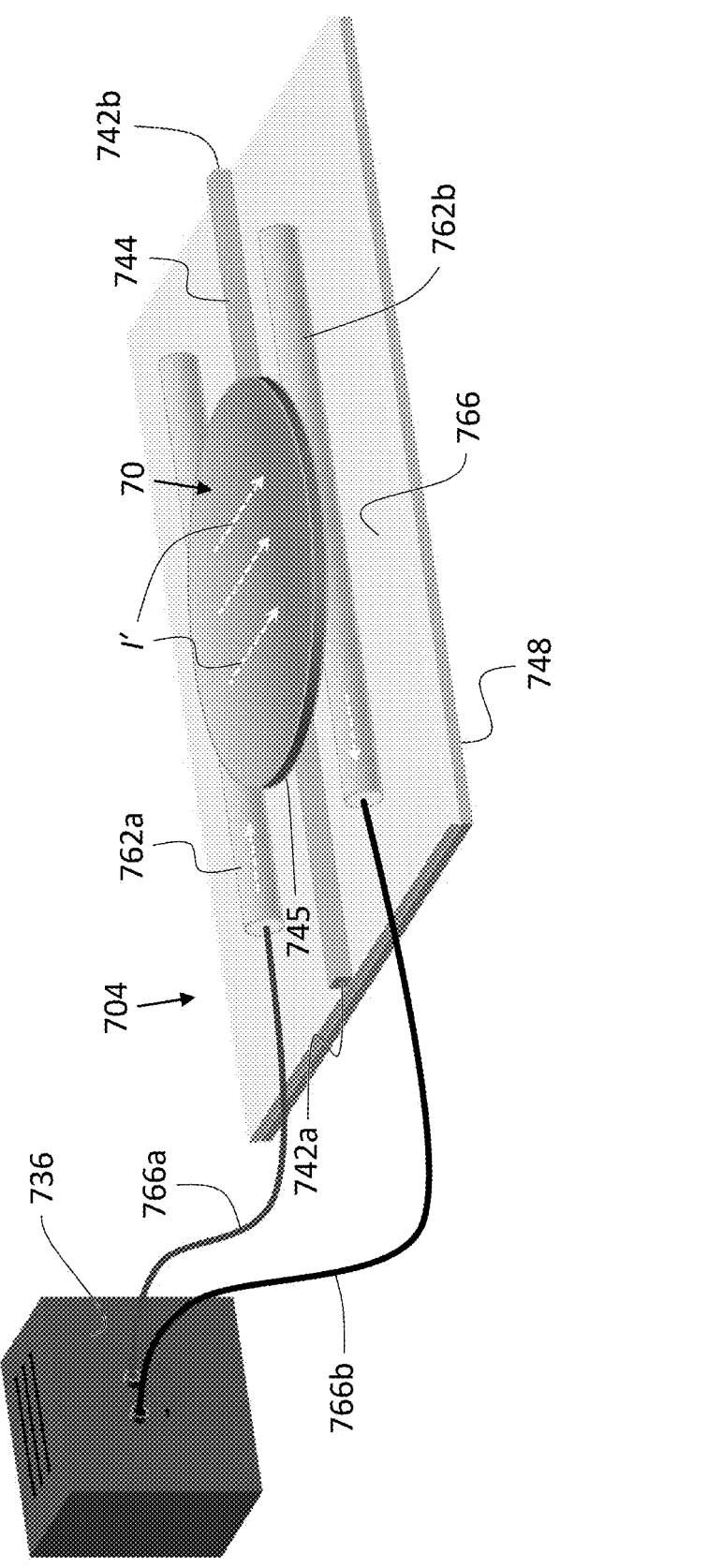
FIG. 7B provides an enlarged view of a microstrip of the system of FIG. 7A, next to which a sample is positioned, the microstrip includes a pair of conductive interfaces contacting the sample, according to some embodiments.

According to some embodiments, wherein sample 50 is or includes a thin film (e.g. including metallic material and/or magnetic material), waveguide 504 is a planar transmission line, the first conductive interface and the second conductive interface may be positioned on an outer surface of the planar transmission line, as shown, for example, in FIG. 7B). The planar transmission line and the sample holder are configured to allow positioning thereof such that, in addition to sample 50 being adjacent to an elongated conductor (such as elongated conductor 744) of the planar transmission line with the thin film facing the elongated conductor (such that when the thin film includes multiple layers, which include a magnetic layer, the magnetic layer is positioned closest to the elongated conductor apart from an optional cap layer, which, when included, coats the magnetic layer) and the produced magnetic field being in-plane (i.e. parallel to the thin film; at least when at about maximum strength), the conductive interfaces contact the thin film, thereby facilitating measurement of spin currents in the thin film. According to some such embodiments, the planar transmission line and the sample are configured such that in addition to the produced magnetic field being in-plane (at least when at about maximum strength), the produced magnetic field points along a selectable azimuth angle. According to some embodiments, the above-described measurements are implemented for each of a plurality of DC voltages applied across the thin film (i.e. different DC currents driven through the thin film), increasing by n-fold the number of demodulated signals when the number of the different DC voltages equal n. According to some such embodiments, computer hardware 532 may be configured to process the plurality of demodulated signal and parameters of the DC currents, and, based thereon, compute a spin Hall angle $\theta_{SH}$ of the thin film.

More specifically, according to some embodiments, a plurality of DC voltages may be applied so as to measure absorption spectra at each of opposite current pairs. According to some such embodiments, computer hardware 532 may be configured to extract $\theta_{SH}$ from the dependence of the difference in resonance linewidths (linewidths at half-peak height) on the magnitude of the current, as detailed in the description of FIG. 11F.

According to some embodiments, electric power supply 536 may be configured to supply a controllable DC current. According to some such embodiments, electric power supply 536 may be a DC power supply. According to some embodiments, system 500 further includes electric power supply 536.

In operation, magnetic field generator 502 produces a temporally modulated magnetic field in the region R. A modulation rate of the magnetic field is measured using first sensor 512. An EM signal, generated by EM signal generator 518, is transmitted into waveguide 504 and propagated therethrough. On exiting waveguide 504, the power of the transmitted portion of the EM signal is measured by second sensor 514 to obtain a measured signal. As the EM signal propagates through waveguide 504, a small fraction thereof leaks out of waveguide 504, penetrates into sample 50, and is absorbed thereby. The instantaneous amount of leaked radiation, which is absorbed, depends on the instantaneous magnitude of the magnetic field applied on sample 50, which in turn depends on the modulation profile (as well as the distance from sample 50 to magnetic field generator 502). The power of the transmitted portion and the measured signal are therefore accordingly modulated. The amplitude of the measured signal depends on the amplitude of the magnetic field to which sample 50 is subjected. The closer the magnetic field amplitude is to the value specified by the resonance condition (i.e. the magnitude of the magnetic field for which the coupling between the EM signal and the spins in sample 50 is at resonance), the greater the absorption of leaked EM radiation by sample 50 and the smaller the amplitude of the measured signal. The above is repeated for a plurality of distances between sample 50 and magnetic field generator 502 (optionally, excluding repeated measurements of the modulation rate). In particular, according to some embodiments, for at least some of the plurality of distances, the interaction between the EM radiation leaked out of waveguide 504 and spins in sample 50 reaches resonance. The thus-obtained measured signals are demodulated using heterodyne-based demodulator 522.

According to some embodiments, the above procedure may be implemented for different frequencies of the EM signal (e.g. in each implementation having EM signal generator 518 transmit an EM signal of different frequency).

According to some embodiments, wherein the produced magnetic field is about in-plane (at least when at about maximum strength), the conductive interfaces are used to pass a DC current through the thin film. Due to the spin Hall effect, the passage of the DC currents leads to the appearance of a spin current. The presence of the spin currents affects the shape of the respective absorbance peak, thereby facilitating improved accuracy measurements of the spin Hall angle.

Computer hardware 532 processes (analyzes) the demodulated signals to obtain one or more sample parameters parameterizing one or more properties of sample 50, as described above.

As mentioned above, according to some alternative embodiments, magnetic field generator 502 is configured to subject a sample (e.g. sample 50) to a temporally modulated magnetic field by alternately magnetically shielding and unshielding a (permanent and/or temporary) magnet(s). The shielding and unshielding may be implemented through the opening and closing of a shutter, which is made of a material characterized by high magnetic permeability (e.g. a mu-metal), and is positioned between the magnet(s) and the sample on a screen made of the same material as the shutter or a like material. Alternatively, a rotatable disc (or plate), which is characterized by high magnetic permeability and including offset holes (i.e. holes which are offset relative to the rotational axis of the disc), may be utilized. In such embodiments, as a non-limiting example, a (permanent or temporary) magnet may be positioned on one side of the disc (e.g. at about the same offset as the holes relative to the rotational axis) with the sample being positioned opposite the magnet on the other side of the disc.

According to some alternative embodiments, wherein waveguide 504 is a planar transmission line, waveguide 504 may be configured to function as a microwave resonant cavity. This may be realized, for example, during production of the planar transmission line by introduction of (or modification of the planar transmission line to include) a pair of lateral surfaces (e.g. laterally bisecting the elongated conductor of the planar transmission line), which break otherwise the longitudinal uniformity of the planar transmission line. The microwave cavity is defined between those two lateral surfaces. In such embodiments, system 500 functions similarly to conventional FMR cavity-based systems with the advantage of being tabletop and less complex. According to some such embodiments, the planar transmission line may be easy to decouple (disconnect) from EM signal generator 518 and second sensor 514, thereby allowing to quickly reconfigure system 500 for (FMR-cavity based) testing at another resonance frequency (i.e. using a different planar transmission line configured to function as a microwave resonant cavity exhibiting resonance at the other resonance frequency). This stands in contrast to conventional FMR cavity-based systems, which typically are not configured to allow changing the resonance frequency. More precisely, in conventional FMR cavity-based systems, changing the resonance frequency by replacing (only) the resonant cavity is not an option, since additional components (coupled to the resonant cavity), such as waveguides, waveguide antennas, and waveguide detectors, will have to be changed as well.

According to some embodiments, there is provided a system for FMR-cavity based testing of samples. The system is similar to system 500 but differs therefrom at least in necessarily including a plurality of planar transmission lines. Each of the planar transmission lines is modular in the sense of allowing for easy replacement (installation and removal) of the planar transmission lines, and, in particular, easy coupling an of the planar transmission line to the EM signal generator and the second sensor and decoupling of the planar transmission line from the EM signal generator and the second sensor (e.g. using dedicated ports (not shown) on planar transmission line, which are each configured to connect to a coaxial cable). Each of the planar transmission lines is configured to function as a microwave resonant cavity exhibiting a different resonance frequency, respectively.

FIG. 6A schematically depicts a system 600 for magnetic testing of samples, such as a sample 60, according to some embodiments. System 600 includes a magnetic field generator 602, a waveguide 604, a Hall sensor 612 (or a mechanical magnetic switch or a magnetic pickup coil with an electric amplifier), an RF power detector 614 (e.g. an RF diode detector), an EM signal generator 618, and a heterodyne-based demodulator 622 (e.g. a lock-in amplifier). Magnetic field generator 602 corresponds to specific embodiments of magnetic field generator 502. Waveguide 604, Hall sensor 612, RF power detector 614, EM signal generator 618, and heterodyne-based demodulator 622 correspond to specific embodiments of waveguide 504, first sensor 512, second sensor 514, EM signal generator 518, and heterodyne-based demodulator 522, respectively.

Sample 60 corresponds to specific embodiments of sample 50. According to some embodiments, sample 60 is, or is included in, a magnetic memory device in one of the stages of the fabrication thereof, as detailed above in the description of sample 50. For example, according to some embodiments, sample 60 may be a thin film exposed on the magnetic memory device during the fabrication thereof, as detailed above in the description of sample 50. According to some alternative embodiments, sample 60 may be constituted by a material, which includes free radicals and which is in the form of liquid drops applied on and/or near waveguide 604 or a powder scattered on and/or near waveguide 604. Sample 60 is not included in system 600.

Magnetic field generator 602 includes a rotatable plate 652, a motor 654, and (one or more) magnet units 658. Plate 652, motor 654, and magnet units 658 correspond to specific embodiments of plate 102, motor 104, and magnet units 108, respectively.

According to some embodiments, and as depicted in FIG. 6A, system 600 may further include displacement infrastructure 660, which corresponds to specific embodiments of displacement infrastructure 130.

Magnetic field generator 602 is configured to produce a temporally modulated magnetic field over a region R' (delineated by a dashed-double-dotted line) whereat sample 60 is positioned.

Also indicated is a rotational axis $A_6$ about which plate 652 is configured to be rotated.

A first cable 640a (e.g. a coaxial cable) may extend between EM signal generator 618 and a first (waveguide) end 642a (indicated in FIG. 6B) of waveguide 604. A second cable 640b (e.g. a coaxial cable) may extend between a second (waveguide) end 642b (indicated in FIG. 6B) of waveguide 604 and RF power detector 614.

Figure 6B:
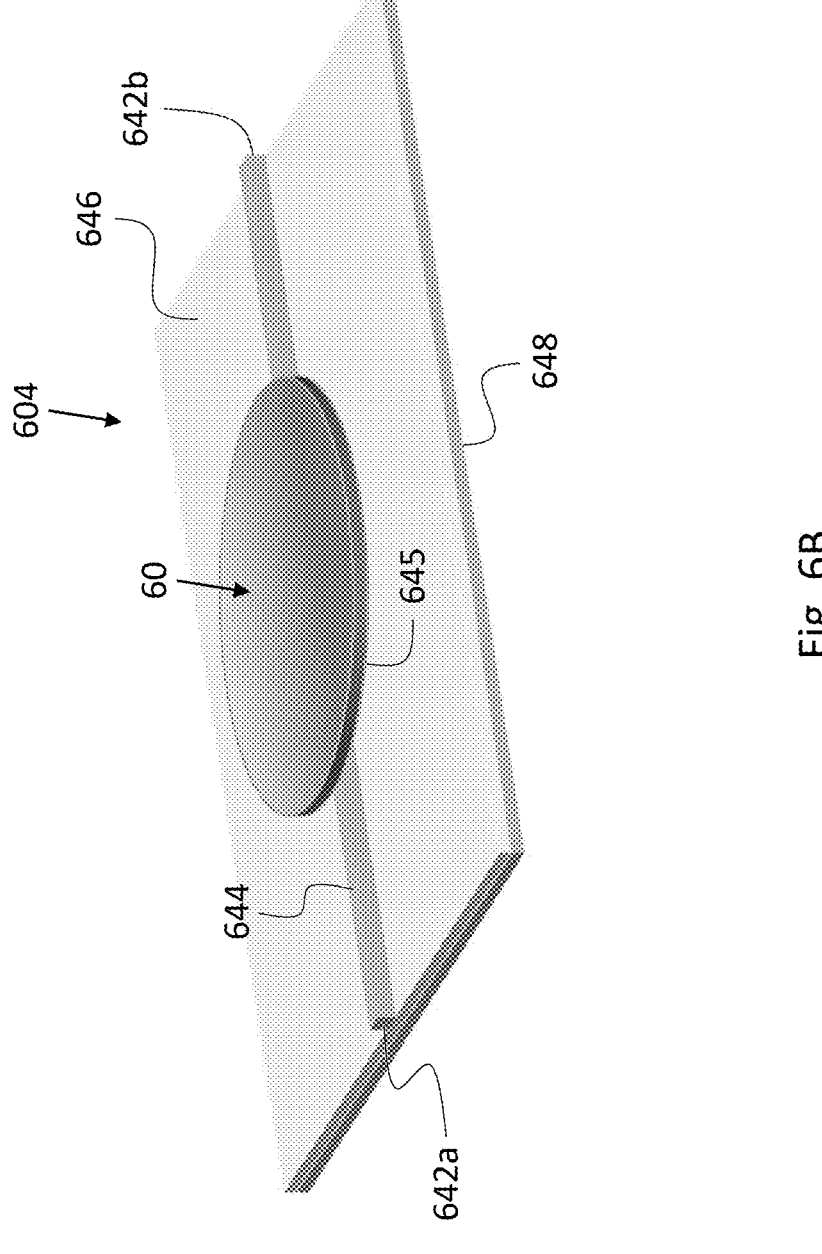
FIG. 6B provides an enlarged view of a microstrip of the system of FIG. 6A next to which a sample is positioned, according to some embodiments.

According to some embodiments, EM signal generator 618 is configured to generate EM signals in the RF range (including the microwave range). As a non-limiting example, according to some embodiments, and as depicted in FIGS. 6A and 6B, waveguide 604 may be a microstrip. Alternatively, according to some embodiments (not shown in FIGS. 6A and 6B), waveguide 604 may be another type of a planar transmission line, such as a coplanar waveguide. FIG. 6B provides an enlarged view of waveguide 604. Waveguide 604 includes an elongated conductor 644 disposed on a dielectric layer 646 (typically termed "substrate"), which is mounted on a ground plane 648. Sample 60 is positioned adjacently to elongated conductor 644 with a magnetic (e.g. ferromagnetic) layer 645 of sample 60 (in embodiments wherein sample 60 includes layers of different materials) located adjacently to elongated conductor 644 (optionally with a cap layer (not indicated) of sample 60 being positioned there between magnetic layer 645 and elongated conductor 644 but apart from such an optional cap layer, magnetic layer 645 is the closest to elongated conductor 644 out of all the layers of sample 60).

Optionally, according to some embodiments, system 600 further includes a computer 632, which corresponds to specific embodiments of computer hardware 532 including controller 530.

In operation, an EM signal (e.g. a mono-frequency EM signal), generated by EM signal generator 618, is propagated through first cable 640a and is transmitted into waveguide 604 via first waveguide end 642a. The EM signal propagates across waveguide 604 and exits therefrom, and into second cable 640b, via second waveguide end 642b. The EM signal proceeds to propagate through second cable 640b onto RF power detector 614, which measures the power thereof. The closer the amplitude of the magnetic field, to which sample 60 is subjected, to that specified by the resonance condition, the greater the absorption of the EM signal by sample 60. The above is implemented for a plurality of distances between sample 60 and plate front face 674 (optionally, excluding repeated measurements of the modulation rate). In particular, according to some embodiments, for at least some of the plurality of distances, the interaction between EM radiation leaked out of waveguide 604 and spins in sample 60 reaches resonance. The thus-obtained measured signals are demodulated using heterodyne-based demodulator 622, as described above in the description of FIG. 5.

According to some embodiments, the above procedure may be implemented for different frequencies of the EM signal (e.g. in each implementation having EM signal generator 618 transmit an EM signal of different frequency), thereby allowing to obtain the dependence of the shape of the absorption peak on the frequency of the EM signal, as described above in the description of FIG. 5.

Computer 632 processes the demodulated signals to obtain one or more sample parameters parameterizing one or more properties of sample 60, as described above in the description of computer hardware 532.

According to some embodiments, there is provided a system for FMR-cavity based testing of samples. The system is similar to system 600 but differs therefrom in necessarily including a plurality of planar transmission lines (e.g. microstrips or coplanar waveguides). Each of the planar transmission lines is modular in the sense of allowing for easy replacement (installation and removal) of the planar transmission line, and, in particular, easy coupling of the planar transmission line to the EM signal generator and the RF power detector and decoupling of the planar transmission line from the EM signal generator and the RF power detector (e.g. using dedicated ports (not shown) on planar transmission line, which are each configured to connect to a coaxial cable). Each of the planar transmission lines is configured to function as a microwave resonant cavity exhibiting a different resonance frequency, respectively.

FIG. 7A schematically depicts a system 700 for FMR-based testing of samples, such as a sample 70, according to some embodiments. System 700 includes a magnetic field generator 702, a waveguide 704 (indicated in FIG. 7B), a Hall sensor 712 (or a mechanical magnetic switch or a magnetic pickup coil with an electric amplifier), an RF power detector 714 (e.g. an RF diode detector), an EM signal generator 718, a heterodyne-based demodulator 722 (e.g. a lock-in amplifier), an electric power supply 736, and a first conductive interface 762a (indicated in FIG. 7B) and a second conductive interface 762b (indicated in FIG. 7B). Conductive interfaces 762a and 762b may be disposed on an external surface of waveguide 704, e.g. as depicted in FIG. 7B. Magnetic field generator 702 corresponds to specific embodiments of magnetic field generator 502. Waveguide 704, Hall sensor 712, RF power detector 714, EM signal generator 718, heterodyne-based demodulator 722, and electric power supply 736, correspond to specific embodiments of waveguide 504, first sensor 512, second sensor 514, EM signal generator 518, heterodyne-based demodulator 522, and electric power supply 536, respectively. According to some embodiments, system 700 may further include a sample holder (not), which is configured to support sample 70.

Sample 70 corresponds to specific embodiments of sample 50. According to some embodiments, sample 70 is, or is included in, a magnetic memory device in one of the stages of the fabrication thereof, as detailed above in the description of sample 70. For example, according to some embodiments, sample 70 may be a thin film exposed on the magnetic memory device during the fabrication thereof, as detailed above in the description of sample 50. In particular, the thin film may be multilayer film including a non-magnetic metallic layer and a magnetic layer disposed on of the metallic layer externally thereto (e.g. when the thin film is positioned on a substrate, the metallic layer is positioned between the substrate and the magnetic layer). Sample 70 is not included in system 700.

According to some embodiments, magnetic field generator 702 includes a rotatable plate 752, a motor 754, and (one or more) magnet units 758. Plate 752, motor 754, and magnet units 758 correspond to specific embodiments of plate 302, motor 104, and magnet units 308, respectively. Alternatively, according to some embodiments, plate 752, motor 754, and magnet units 758 correspond to specific embodiments of plate 402, motor 104, and magnet units 408a and 408b, respectively. According to some embodiments, and as depicted in FIG. 7A, system 700 may further include displacement infrastructure 760, which corresponds to specific embodiments of displacement infrastructure 130.

Magnetic field generator 702 is configured to produce a temporally modulated magnetic field over a region R" (delineated by a dashed-double-dotted line) whereat sample 60 is positioned.

Also indicated is a rotational axis $A_7$ about which plate 752 is configured to be rotated.

A first cable 740a (e.g. a coaxial cable) may extend between EM signal generator 718 and a first (waveguide) end 742a (indicated in FIG. 7B) of waveguide 704. A second cable 740b (e.g. a coaxial cable) may extend between a second (waveguide) end 742b (indicated in FIG. 7B) of waveguide 704 and RF power detector 714. A first electrical wire 766a may extend between a first terminal 768a of electric power supply 736 and first conductive interface 762a. A second electrical wire 766b may extend between a second terminal 768b of electric power supply 736 and second conductive interface 762b.

According to some embodiments, EM signal generator 718 is configured to generate EM signals in the RF range (including the microwave range). As a non-limiting example, according to some embodiments, and as depicted in FIGS. 7A and 7B, waveguide 704 may be a microstrip with conductive interfaces 762a and 762b disposed thereon. Alternatively, according to some embodiments (not shown in FIGS. 7A and 7B), waveguide 704 may be another type of a planar transmission line, such as a coplanar waveguide with conductive interfaces 762a and 762b disposed on an outer surface of the planer transmission line. The relative positioning of first conductive interface 762a and second conductive interface 762b is such as to allow each to contact sample 70 and thereby close an electrical conduction path passing through sample 70.

FIG. 7B provides an enlarged view waveguide 704. Waveguide 704 includes an elongated conductor 744 disposed on a dielectric layer 746 (typically termed "substrate"), which is mounted on a ground plane 748. Waveguide 704 additionally includes conductive interfaces 762a and 762b, which are disposed on dielectric layer 746 (e.g. in parallel to elongated conductor 744). Sample 70 is shown positioned adjacently to elongated conductor 744 and contacting each of conductive interfaces 762a and 762b. According to some embodiments, and as depicted in FIGS. 7A and 7B, each of conductive interfaces 762a and 762b may be or include a conductive rubber. According to some embodiments, each of the conductive interfaces may be constituted by or include a strip of conductive lacquer, conductive epoxy glue, and/or a conductive silver paint, which is disposed on dielectric layer 746. More specifically, a magnetic (e.g. paramagnetic) layer 745 of sample 70 (in embodiments wherein sample 70 includes layers of different materials) is shown located adjacently to elongated conductor 744 (optionally with a cap layer (not indicated) of sample 70 being positioned there between magnetic layer 745 and elongated conductor 744 but apart from such an optional cap layer, magnetic layer 745 is the closest to elongated conductor 744 out of all the layers of sample 70).

Waveguide 704 and the sample holder are configured to allow positioning thereof such that, in addition to sample 70 being adjacent to elongated conductor 744 with the thin film facing elongated conductor 744 and each of conductive interfaces 762a and 762b contacting the thin film, the produced magnetic field, at least when at maximum strength, is in-plane, thereby facilitating measurement of spin currents in the thin film.

According to some embodiments, waveguide 704 and the sample holder may be further configured to allow positioning thereof such that, in addition to sample 70 being adjacent to waveguide 704 with the thin film facing waveguide 704 and each of conductive interfaces 762*a* and 762*b* contacting the thin film, the produced magnetic field, at least when at maximum strength, is at oriented at a preselected angle relative to the thin film (e.g. perpendicularly thereto).

Optionally, according to some embodiments, system 700 further includes a computer 732, which corresponds to specific embodiments of computer hardware 532 including controller 530.

In operation, electric power supply 736 is used to apply a DC voltage between conductive interfaces 762*a* and 762*b* and pass a current (indicated by white dashed arrows I'; not all of which are labelled) through the thin film. Due to the spin Hall effect, a spin current is formed. Simultaneously, an EM signal (e.g. a mono-frequency EM signal), generated by EM signal generator 718, is propagated through first cable 740*a* and is transmitted into waveguide 704 via first waveguide end 742*a*. The EM signal propagates across waveguide 704 and exits therefrom, and into second cable 740*b*, via second waveguide end 742*b*. The EM signal proceeds to propagate through second cable 740*b* onto RF power detector 714, which measures the power thereof. The closer the amplitude of the magnetic field, to which the thin film is subjected, to that specified by the resonance condition, the greater the absorption of the EM signal by the thin film. The presence of the spin currents affects the shape of the respective absorbance peak. The above is implemented for a plurality of distances between sample 70 and plate front face 774 (optionally, excluding repeated measurements of the modulation rate), and different DC voltages (i.e. different currents). In particular, according to some embodiments, for some of the plurality of distances a coupling between the respective EM signal and spins in sample 70 reaches resonance. The thus obtained measured signals are demodulated using heterodyne-based demodulator 722, as described above in the description of FIG. 5.

According to some embodiments, computer 732 may be configured to compute the spin Hall angle $\theta_{SH}$ of the thin film. To this end, computer 732 may be configured to compute the dependence of the resonance linewidth on the current passed through sample 70. The resonance linewidth varies due to the damping/anti-damping torque according to the Landau-Lifshitz-Gilbert-Slonczewski equation. Namely, the generated spin currents effectively change α (the Gilbert damping coefficient).

According to some embodiments, the above procedure may be implemented for different frequencies of the EM signal (e.g. in each implementation having EM signal generator 718 transmit an EM signal of different frequency), thereby allowing to obtain the dependence of the shape of the absorption peak on the frequency of the EM signal, as described above in the description of FIG. 5.

Computer 732 processes the demodulated signals to obtain one or more sample parameters parameterizing one or more properties of sample 70, as described above in the description of computer hardware 532.

It is noted that system 700 does not require the presence of dedicated patterned components in a thin film in order to measure a spin current induced therethrough. In particular, according to some embodiments, sample 70 advantageously does not include any such dedicated patterned components. Measurement of spin currents can therefore advantageously be carried out directly on the thin film (immediately after the thin film is grown). This in turn accelerates the fabrication process of a device (e.g. a magnetic memory device) including the thin film (or at least some layers of the thin film e.g. in embodiments wherein the magnetic layer is removed following testing, while the non-magnetic metallic layer is kept).

According to some embodiments, there is provided a system for FMR-cavity based testing of samples. The system is similar to system 700 but differs therefrom in necessarily including a plurality of planar transmission lines (e.g. microstrips including conductive interfaces as depicted, for example, in FIG. 7B). Each of the planar transmission lines is modular in the sense of allowing for easy replacement (installation and removal) of the planar transmission line, and, in particular, easy coupling of the planar transmission line to the EM signal generator and the RF power detector and decoupling of the planar transmission line from the EM signal generator and the RF power detector (e.g. using dedicated ports (not shown) on planar transmission line, which are each configured connect to a coaxial cable), and easy coupling of each of the conductive interfaces, which are positioned on the planar transmission line, to the electric power supply and decoupling thereof from the electric power supply (e.g. using dedicated ports (not shown) on planar transmission line, which are each configured connect to an wire). Each of the planar transmission lines is configured to function as a microwave resonant cavity exhibiting a different resonance frequency, respectively.

Methods for Magnetic Testing of Samples

According to an aspect of some embodiments, there is provided a method for magnetic testing of samples. FIG. 8 presents a flowchart of such a method, a method 800, according to some embodiments. Method 800 includes:

A setup stage 810 wherein a magnetic field generator (e.g. magnetic field generator 602), and a sample, which is to be tested, are provided. The magnetic field generator is configured to produce a temporally modulated magnetic field by rotating at least one magnet, which is permanent.

A data acquisition stage 820 including, for each of a plurality of temporal modulation amplitudes of the magnetic field and/or frequencies of an (e.g. mono-frequency) EM signal:

A substage 820*a*, wherein the (temporally modulated) magnetic field is produced whereat the sample is positioned.

A substage 820*b*, wherein the EM signal is transmitted (e.g. by EM signal generator 618) into a waveguide (e.g. into waveguide 604 via first waveguide end 642*a*) positioned adjacently to the sample.

A substage 820*c*, wherein a measured signal is obtained by measuring (e.g. using RF power detector 614) a power of the transmitted EM signal (i.e. the portion of the EM signal transmitted through the waveguide and exiting via the second end of the waveguide, e.g. second waveguide end 642*b*) over a time interval spanning multiple rotation cycles of the at least one magnet.

A data processing stage 830 including:

A substage 830*a* wherein each of the measured signals is demodulated (e.g. by heterodyne-based demodulator 622) using a respective reference signal indicative of the modulation rate of the respective (temporally modulated) magnetic field.

A substage 830*b* wherein the demodulated signals are processed (e.g. by computer 632) to obtain one or more sample parameters parameterizing one or more properties of the sample.

Method 800 may be implemented using system 500, or specific embodiments thereof, such as system 600. In particular, the magnetic field generator provided in setup stage 810 and used in data acquisition stage 820 may be magnetic field generating device 100 or specific embodiments thereof, such any one of magnetic field generating devices 100', 200, 300, 300''', 400, 400', 602, and 702. Method 800 may be applied to any of one the embodiments of sample 50 specified above in the description thereof.

In data acquisition stage 820, the amplitude of the magnetic field, to which the sample is subjected, may be varied by changing a distance between the sample and the magnetic field generator.

According to some embodiments, the reference signal may be obtained using a Hall sensor, a mechanical magnetic switch, or a magnetic pickup coil with an electric amplifier during data acquisition stage 820, as explained above, for example, in the description of FIG. 6A. Alternatively, the reference signal may be derived (obtained) from a raw signal (e.g. the first signal according to some embodiments wherein the modulation rate is indirectly measured), which is obtained from optical measurements using a light beam source (e.g. laser beam generator 12'), and a light sensor (e.g. photodetector 14'), or e.g. an opto-coupler.

In substage 830*b* the demodulated signals may be processed as described above in the descriptions of computer hardware 532 and computer hardware 632, and as expounded on below in the Experimental results subsection. More specifically, the demodulated signals may be processed to obtain parameters quantifying properties of the sample, such as the magnetization saturation, the Gilbert damping, the effective anisotropy, the magnetic inhomogeneity, the gyromagnetic ratio, the g-factor, and one or more resonance linewidths corresponding to one or more frequencies. To this end, as explained above in the description of computer hardware 532, as an intermediate step, one or more spectral parameters characterizing the dependence of the absorption (which is extracted through demodulation of the measured signals) on the applied magnetic field. In particular, the spectral parameters may include parameters characterizing the shape and location of obtained resonance peaks.

The skilled person will readily perceive that method 800 may also be implemented using a magnetic field generator, which is configured to produce a temporally modulated magnetic field by alternately magnetically shielding and unshielding at least one permanent magnet and/or at least one temporary magnet, as described above in the description of system 500.

FIG. 9 present a flowchart of a method 900 for FMR-based testing of thin films or ultra-thin films (i.e. few atoms thick), according to some embodiments. Method 900 corresponds to specific embodiments of method 800 wherein the sample is or includes thin film, such as the thin films listed above in the description of samples 50 and 70. In particular, method 800 may be applied to thin films including metallic material and magnetic and/or magnetizable material, for example, bilayer films including a non-magnetic metallic layer and a magnetic layer. Method 900 includes:

A setup stage 910 wherein a magnetic field generator (e.g. magnetic field generator 702), and a thin film, which is to be tested, are provided. The magnetic field generator is configured to produce a temporally modulated magnetic field by rotating at least one magnet, which is permanent.

A data acquisition stage 920 including, for each of a plurality of temporal modulation amplitudes of the magnetic field and/or frequencies of an (e.g. mono-frequency) EM signal, and each of a plurality of electric current amplitudes:

A substage 920*a*, wherein the (temporally modulated) magnetic field is produced whereat the thin film is positioned, such that, at least when the magnetic field is at about maximum strength, the magnetic field is about parallel to the thin film (i.e. the produced magnetic field is about in-plane).

A substage 920*b*, wherein the EM signal is transmitted (e.g. by EM signal generator 718) into a waveguide (e.g. into waveguide 704 via first waveguide end 742*a*) positioned adjacently to the thin film.

A substage 920*c*, wherein an electric current is passed (e.g. using electric power supply 736 and conductive interfaces 762*a* and 762*b*) through the thin film.

A substage 920*d*, wherein a measured signal is obtained by measuring (e.g. using RF power detector 714) a power of the transmitted EM signal (i.e. the portion of the EM signal transmitted through the waveguide and exiting via the second end of the waveguide, e.g. second waveguide end 742*b*) over a time interval spanning multiple rotation cycles of the at least one magnet.

A data processing stage 930 including:

A substage 930*a*, wherein each of the measured signals is demodulated (e.g. by heterodyne-based demodulator 722) using a respective reference signal indicative of the modulation rate of the respective (temporally modulated) magnetic field.

A substage 930*b*, wherein the demodulated signals are processed to obtain one or more sample parameters parameterizing one or more properties of the thin film.

Method 900 may be implemented using system 700 and, more generally, specific embodiments of system 500 including electric power supply 536 and the conductive interfaces. In particular, the magnetic field generator provided in setup stage 910 and used in data acquisition stage 920 may be any one of magnetic field generating devices 300, 300''', 400, 400', and 702, and, more generally, embodiments of magnetic field generating device 100, which allow for positioning of a thin film relative thereto and producing a temporally modulated magnetic, which at least when at about maximum strength, is in-plane and points along a selectable azimuth angle.

In substage 920*b*, in embodiments the thin film includes multiple layers (e.g. a non-magnetic metallic layer and a magnetic layer), the thin film is positioned such that the magnetic layer is adjacent to the waveguide. In particular, out of the layers (excepting an optional cap layer which may coat the magnetic layer), the magnetic layer is closest to the waveguide.

In substage 930*b* the demodulated signals may be processed as described above in the descriptions of computer hardware 532 and computer hardware 732, and as expounded on below in the Experimental results subsection. More specifically, the demodulated signals may be processed to obtain parameters quantifying properties of the sample, such as the magnetization saturation, the Gilbert damping, the effective anisotropy, the magnetic inhomogeneity, the gyromagnetic ratio, and the spin Hall angle. To this end, as explained above in the description of computer hardware 532, as an intermediate step, one or more spectral parameters characterizing the dependence of the absorption (which is extracted through demodulation of the measured signals) on the applied magnetic field. In particular, the spectral parameters may include parameters characterizing the shape and location of obtained resonance peaks.

The skilled person will readily perceive that method 900 may also be implemented using a magnetic field generator, which is configured to produce a temporally modulated magnetic field by alternately magnetically shielding and unshielding at least one permanent magnet and/or at least one temporary magnet, as described above in the description of system 500.

Experimental Results

FIGS. 10A-11D present results of FMR-based measurements obtained using a system, such as system 700 according to some embodiments thereof, as well as results of simulations, which substantiate the obtained results of the FMR-based measurements. FMR-based measurements were performed on a bilayer film including a platinum layer and a permalloy layer each of 7.5 nm thickness. The bilayer film measured 0.9 cm in length and 0.3 cm in width. The temporal profile of the magnetic field produced at a given azimuth angle in front of the magnetic field generator—whereat the bilayer film was positioned—was substantially proportional to an offset sine varying between zero and twice the amplitude of the sine.

Figure 10B:
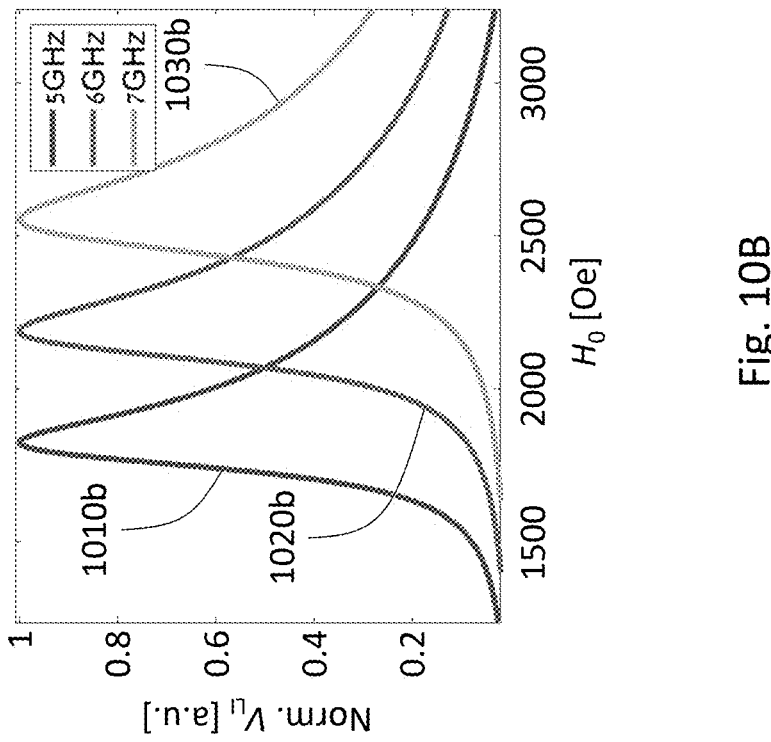
FIGS. 10A to 10F and 11A to 11D present experimental results and simulation results demonstrating the feasibility and utility of the disclosed devices, systems, and methods.
Figure 10A:
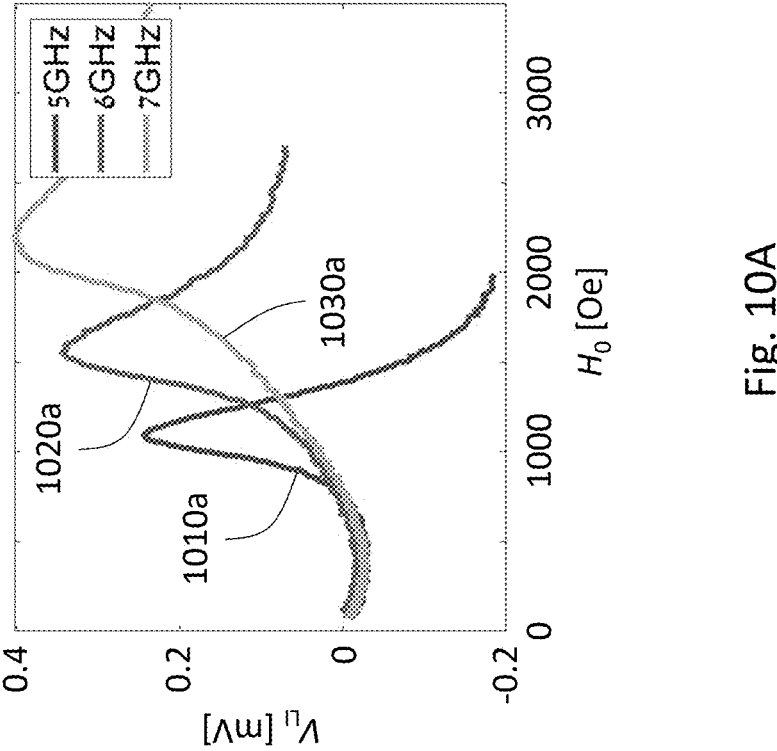

Referring to FIG. 10A, FIG. 10A presents three measured absorption spectra: curves 1010*a* (blue curve), 1020*a* (red curve), and 1030*a* (yellow curve) illustrating the dependence of the output of the lock-in amplifier $V_{LI}$ on the magnetic field amplitude (i.e. the amplitude of the magnetic applied on the bilayer film). The magnetic field amplitude was varied by changing the distance between the magnetic field generator and the bilayer film, as described above in the Systems subsection and the Methods subsection. More specifically, each of curves 1010*a*, 1020*a*, and 1030*a* corresponds to the voltage drop registered by an RF diode detector due to the absorption by the bilayer film of EM radiation leaked out of a microstrip positioned adjacently to the bilayer film. Curves 1010*a*, 1020*a*, and 1030*a* were obtained for EM signal frequencies of 5 GHz, 6 GHz, and 7 GHz, respectively (i.e. the frequency of the EM signal transmitted into the waveguide was 5 GHz, 6 GHz, and 7 GHz, respectively). The relatively high losses (inferable from the linewidths of the curves) agree well with the structure of the bilayer film in which spin pumping from the permalloy layer into the platinum layer (which absorbs the spin angular momentum) occurs.

Figure 10D:
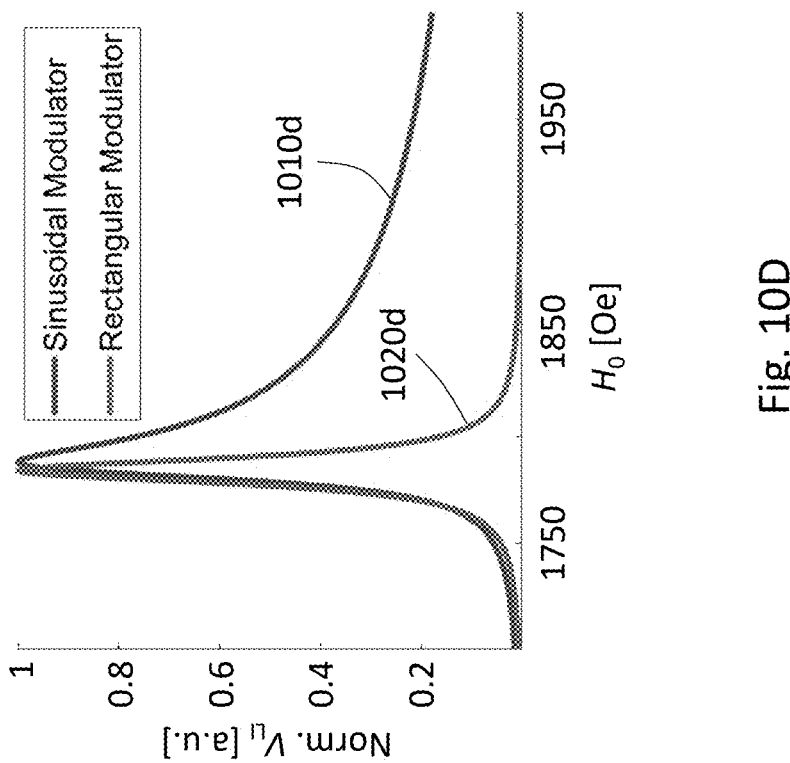

Each of the curves 1010*a*, 1020*a*, and 1030*a* exhibits a steep increase (as the magnetic field amplitude is increased) to a respective peak (maximum absorption), which is followed by a moderate decrease (as the magnetic field amplitude is decreased). As evident from FIG. 10C, and as elaborated on below, the asymmetry is due to the fact that when the magnetic field amplitude is above resonance magnitude (the magnitude of the magnetic field for which resonance is attained) the resonance magnitude is reached twice for each passage of a magnet unit in front the bilayer film. As shown in FIG. 10D, and as elaborated on below, asymmetry may be removed by employing a magnetic field generator configured to produce an on/off square modulation.

FIG. 10B presents analogous results to those of FIG. 10A obtained through computer simulation of the measurement of the bilayer film by the system. More specifically, system 700, according to some embodiments thereof, was simulated. The temporal profile of the applied magnetic field was modelled as (exactly) sinusoidal, i.e.

$$H_{sim}(t) = \frac{1}{2}H_0 \cdot (1 + \sin(\omega_{mod}t)).$$

The voltage drop $\Delta V_{det}(t)$ on the RF diode detector was set to equal $1/(1+\beta^2(t))$ in accordance with a Lorentzian absorption line-shape with $\beta(t)=\gamma(H_{sim}(t)-2\pi f/\gamma)/(2\pi f \cdot \alpha)$. Here $\gamma$ and $\alpha$ are the gyromagnetic ratio and the Gilbert damping coefficient, respectively, of the bilayer film. To obtain the (simulated) output of the lock-in amplifier, $\Delta V_{det}(t)$ was multiplied by $\sin(\Omega_{mod}t)$ and integrated in time according to the lock-in detection scheme. Three simulated absorption spectra—curves 1010*b* (blue curve), 1020*b* (red curve), and 1030*b* (yellow curve)—were obtained for three different simulations corresponding to EM signal frequencies of 5 GHz, 6 GHz, and 7 GHz, respectively.

The locations of the peaks of the measured absorption curves 1010*a*, 1020*a*, and 1030*a*, and the widths thereof, are seen to closely match those of the simulated absorption curves 1010*b*, 1020*b*, and 1030*b*, respectively, demonstrating the feasibility and utility of the disclosed systems and methods. (Each of the curves is normalized such that the maximum absorption is 1.)

Figure 10C:
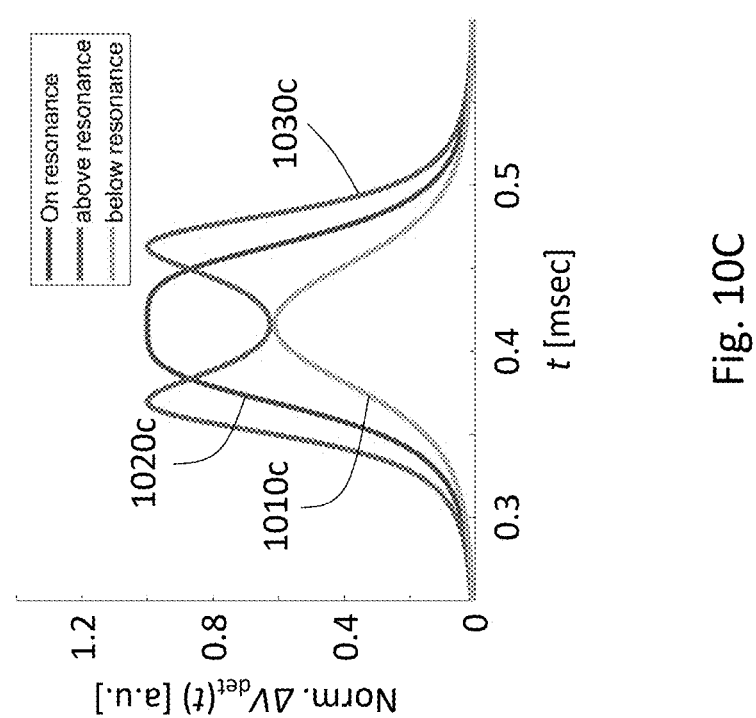

FIG. 10C presents three simulated curves 1010*c* (yellow curve), 1020*c* (blue curve), and 1030*c* (red curve) modelling respective voltage drops, respectively, on a (simulated) RF diode detector for $H_0$—the amplitude of the (simulated) applied magnetic field—below, equal to, and above $H_{res}$—the magnitude of the magnetic field at resonance—for a single passage of a magnet unit in front of the bilayer film. Curve 1030*c* includes two peaks due to $H_{res}$ being reached twice for each passage of the magnet unit in front of the sample. Each of the curves is normalized by the voltage drop at resonance.

FIG. 10D presents two simulated absorption spectra: a curve 1010*d* (blue curve) and curve 1020*d* (red curve). Curve 1010*d* was obtained through computer simulation assuming a sinusoidal modulation profile of the applied magnetic field and an EM signal frequency of 5 GHz, as described above with respect to FIG. 10B. Curve 1020*d* was obtained through computer simulation assuming an on/off square modulation profile of the applied magnetic field (as described above in the description of FIG. 1A, and, in particular, FIG. 3B), and an EM signal frequency of 5 GHz, so that an essentially exact Lorentzian is obtained. (It is noted that the peak of curve 1010*d* is slightly shifted with respect to that peak of curve 1020*d* (the peak of curve 1020*d* is laterally positioned at the theoretical magnitude resonance for 5 GHz). This slight shift not taken into account herein in order to avoid over-encumbering the description. (Each of the curves is normalized such that the maximum absorption is 1.)

Figure 10F:
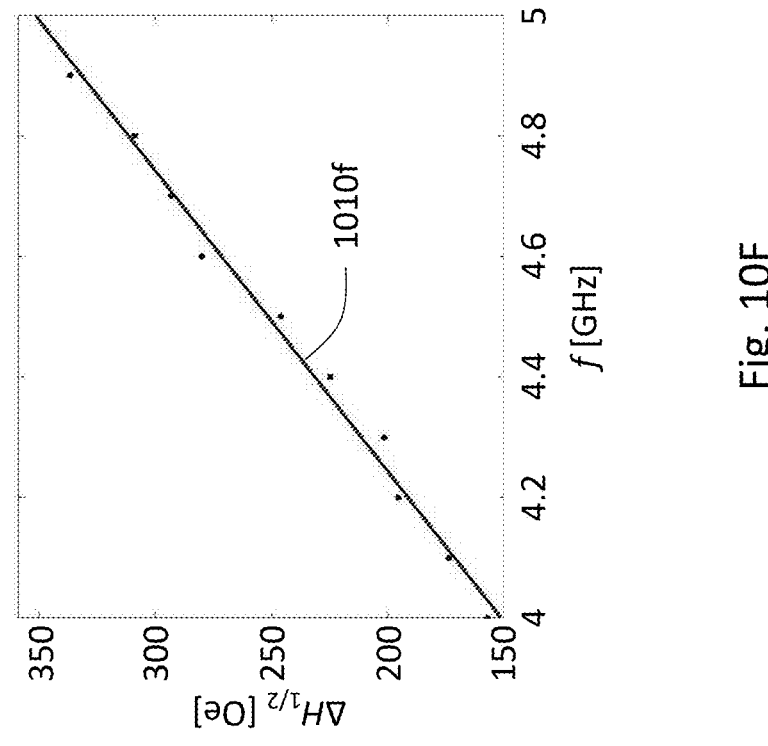
Figure 10E:
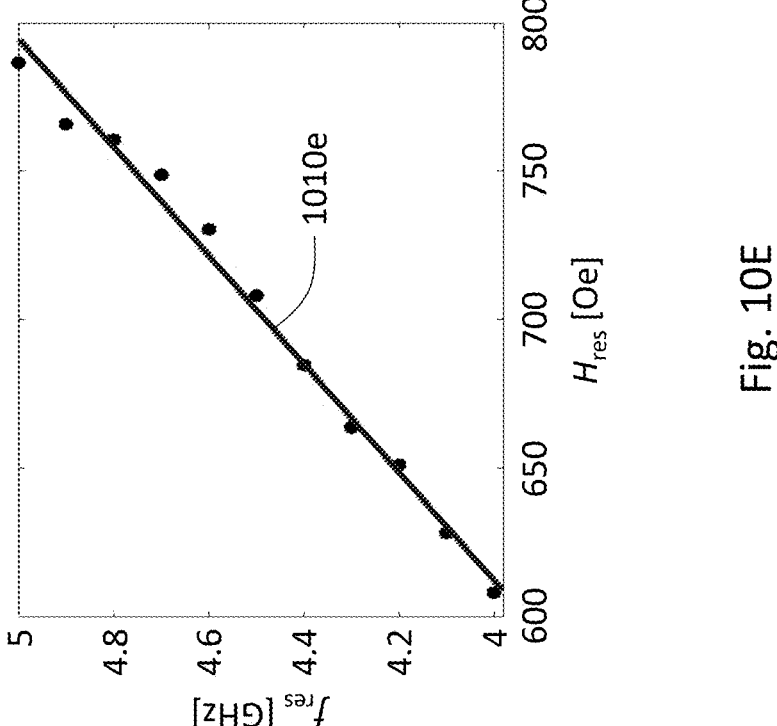

FIG. 10E shows the measured dependence of the resonance frequency $f_{res}$ (the frequency at which for a given value of the magnetic field amplitude, resonance is attained) on the amplitude of the applied magnetic field. A curve 1010*e* was obtained by fitting Kittel's formula to the obtained data points, as described above in the description of system 500. From the measured dependence a value of 27.4 GHz/T was extracted for γ (the gyromagnetic ratio).

FIG. 10F shows the measured dependence of $\Delta H_{1/2}$—the linewidth at half-height (i.e. the width of the absorption curve at half-peak height, also referred to as the "resonance linewidth")—on the frequency f of the EM signal. A curve 1010f was obtained through linear fitting of the data points. From the fitted linear curve a value of 0.0149 was extracted for a using the relation $\alpha = A_c \cdot \gamma \cdot \Delta H_{1/2}/(4\pi \cdot f)$ with $A_c = 0.3597$ due to the fact that the modulation profile was sinusoidal (rather than an on/off square modulation profile).

Figure 11B:
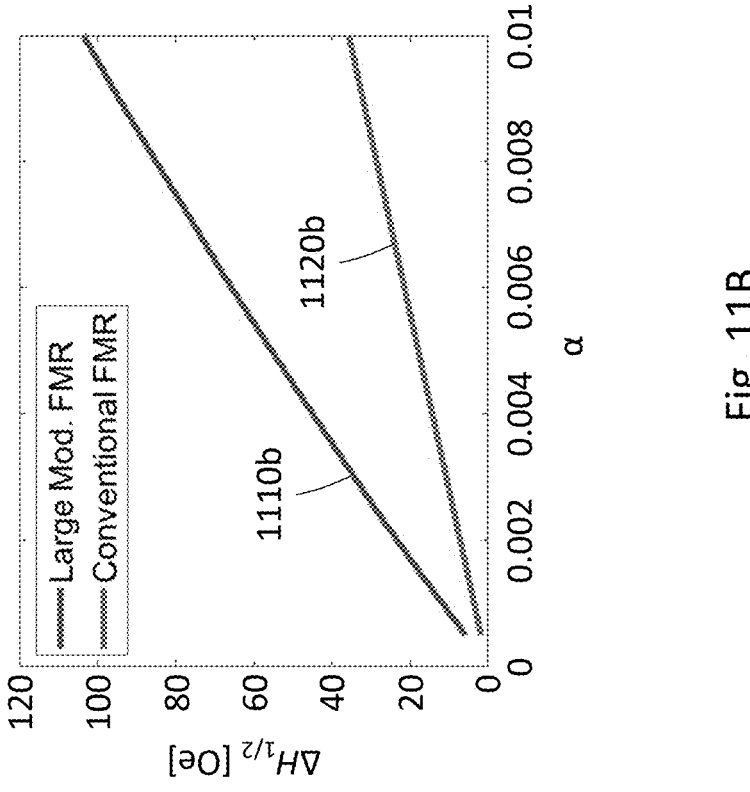
Figure 11A:
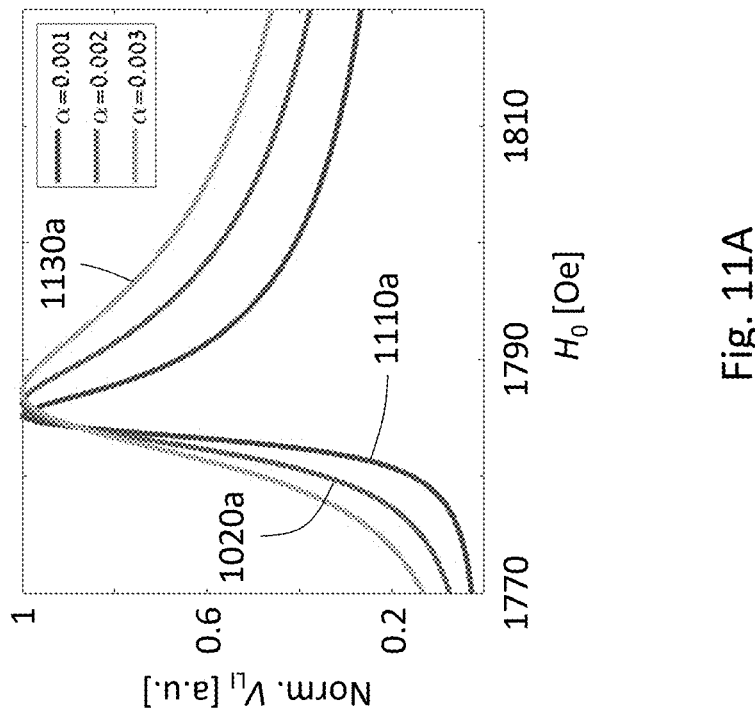

FIG. 11A illustrates the broadening of the resonance linewidth $\Delta H_{1/2}$ as a function of α (the Gilbert damping coefficient). More specifically, shown are three simulated absorption spectra: a curve 1110a (blue curve), a curve 1120a (red curve), and a curve 1130a (yellow curve). Curves 1110a, 1120a, and 1130a were obtained through computer simulation of system 700 at three different a values of 0.001, 0.002, and 0.003, respectively, corresponding to three different respective (simulated) currents (passed through the bilayer film). Due to the passing of the magnetic field, spin currents are induced in the platinum layer, which are pumped into the permalloy wherethrough they are sensed using FMR techniques, as described above in the Systems subsection. (Each of the curves is normalized such that the maximum absorption is 1.)

FIG. 11B presents two curves 1110b (blue curve) and 1120b (red curve) quantifying the dependence of the resonance linewidth $\Delta H_{1/2}$ on α. Curve 1110b was obtained through computer simulation of system 700 while curve 1120b was obtained through modelling of a conventional FMR system. The resonance linewidth is seen to be wider by factor of ~3 as compared to the conventional FMR illustrating the higher sensitivity to spin currents of the disclosed systems and methods.

Figure 11D:
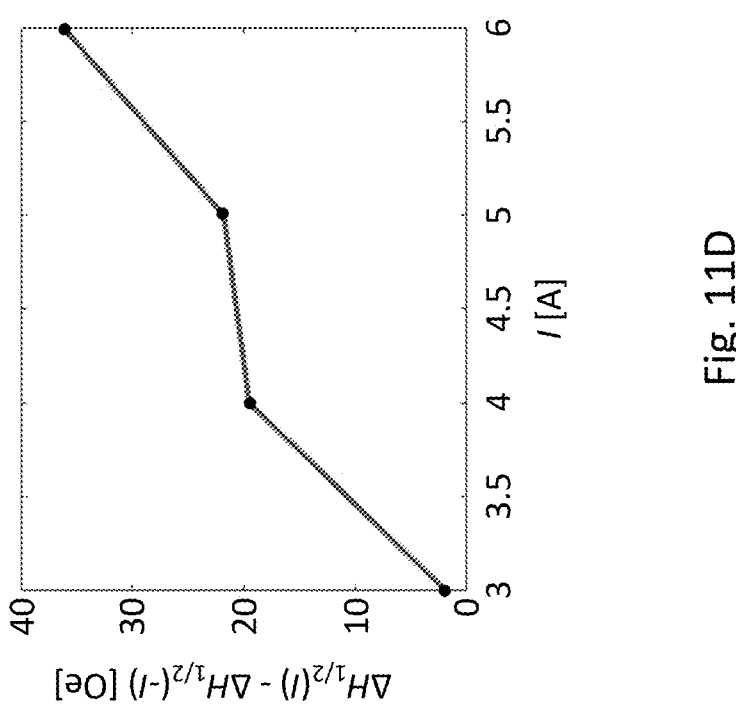
Figure 11C:
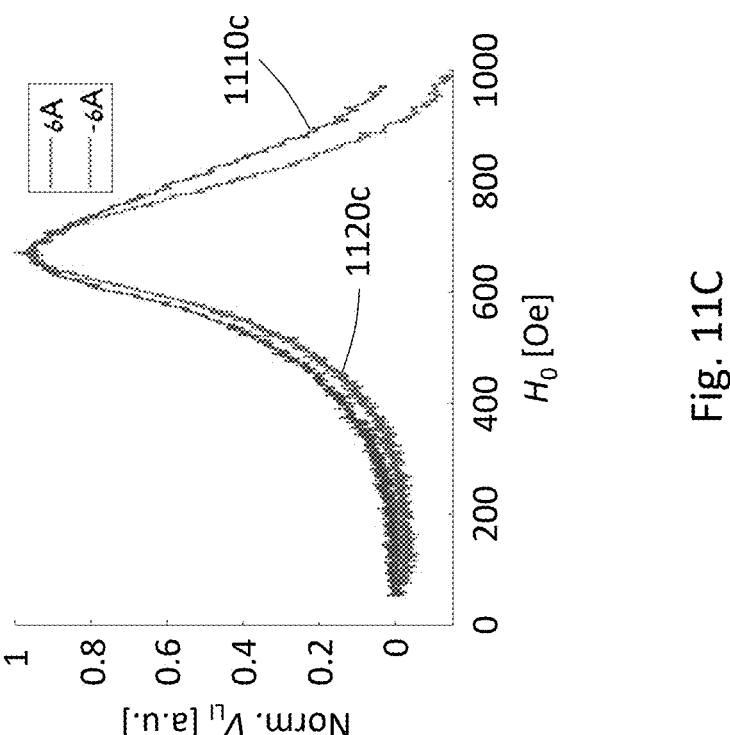

FIG. 11C presents two measured absorption spectra: a curve 1110c (blue) and curve 1120c (red). Curves 1110c and 1120c were obtained at an EM signal frequency of 3.5 GHz with a current of 6 A and −6 A passed along the length dimension (0.9 cm) of the bilayer film, respectively. The width of the absorption curves are clearly seen to depend on the current.

In FIG. 11D the measured difference in the linewidths at half-height for two opposite currents is plotted as a function of the magnitude of the current (i.e. $\Delta H_{1/2}(I) - \Delta H_{1/2}(-I)$ is plotted as a function of I). From the dependence of the measured difference on the current a spin Hall angle $\theta_{SH} = 0.228$ was extracted. More specifically, $\theta_{SH}$ was computed using the model described by Liu et al. [Phys. Rev. Lett. 106, 036601 (2011)] with the sinusoidal modulation and the resulting broadening of the linewidths accounted for by setting $A_c$ equal to 0.359, as described above with respect to FIG. 10F.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods, according to some embodiments, may be described in a specific sequence, the methods of the disclosure may include some or all of the described stages carried out in a different order. In particular, it is to be understood that the order of stages and sub-stages of any of the described methods may be reordered unless the context clearly dictates otherwise, for example, when a latter stage requires as input an output of a former stage or when a latter stage requires a product of a former stage. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A system for magnetic testing of samples, the system comprising:

a magnetic field generator configured to, by rotating at least one magnet, which is permanent, produce a temporally modulated magnetic field over a region whereat a sample is positioned;

a waveguide positionable adjacently to the sample;

a first sensor configured to obtain a first signal by directly and/or indirectly measuring a modulation rate of the produced magnetic field;

an electromagnetic (EM) signal generator coupled to a first end of the waveguide and configured to transmit an EM signal into the waveguide;

a second sensor coupled to a second end of the waveguide and configured to obtain a measured signal by measuring a power of a portion of the EM signal transmitted through the waveguide; and a heterodyne-based demodulator communicatively associated with the first sensor and the second sensor and configured to use a reference signal, constituted by or obtained from the first signal, to demodulate the measured signal.

2. The system of claim 1, further comprising displacement infrastructure configured to allow controllably varying a distance between the magnetic field generator and the sample, and thereby allow commensurately varying a maximum strength of the produced magnetic field to which the sample is subjected.

3. The system of claim 2, further comprising a controller communicatively associated with at least the displacement infrastructure and the magnetic field generator and configured to command the displacement infrastructure to vary the distance between the magnetic field generator and the sample, and/or to command the EM signal generator to vary a frequency of the EM signal, so as to obtain a plurality of the measured signal and a plurality of the demodulated signal.

4. The system of claim 1, wherein the first sensor is or comprises a Hall sensor, a mechanical magnetic switch, or a magnetic pickup coil with an electric amplifier); or wherein the first sensor comprises a photodetector, or wherein the first sensor is an opto-coupler or a slotted opto-coupler track sensor.

5. The system of claim 4, wherein the first sensor is or comprises the Hall sensor, the mechanical magnetic switch, or the magnetic pickup coil with an electric amplifier, and wherein the modulation rate is directly measured.

6. The system of claim 1, wherein the second sensor is or comprises a RF power detector.

7. The system of claim 1, wherein the EM signal generator is configured to generate EM signals in the radiofrequency (RF) range.

8. The system of claim 1, wherein the sample is or comprises a metallic, magnetic, and/or magnetizable thin film, which is exposed on the sample, and wherein the waveguide is positionable adjacently to the thin film.

9. The system of claim 8, wherein the thin film is made of or comprises a ferromagnetic material, a ferrimagnetic material, an anti-ferromagnetic material, and/or a paramagnetic material.

10. The system of claim 1, wherein the sample comprises one or more paramagnetic centers and/or wherein the sample comprises free radicals.

11. The system of claim 1, further comprising a sample holder configured to support the sample, wherein the sample holder is positioned between the magnetic field generator and the waveguide.

12. The system of claim 3, wherein the controller is configured to command the displacement infrastructure to vary the distance between the magnetic field generator and the sample, such that, for at least some of the frequencies of the EM signals, an interaction between EM radiation leaked from the waveguide and spins in the sample reaches resonance.

13. The system of claim 12, further comprising one or more processors configured to receive the plurality of the demodulated signal and based thereon compute one or more sample parameters parameterizing one or more properties of the sample.

14. The system of 1, wherein the magnetic field generator comprises:

a frame, which is rotatable about a rotational axis intersecting the frame from a frame back side to a frame front side;

a motor configured to rotate the frame at a controllable angular velocity; and a magnet unit, which comprises one or more permanent magnets, is mounted on the frame front side at a location offset by a distance $r_0$ relative to the rotational axis, and forms in front of the magnet unit a first magnetic field;

wherein, when the frame is rotated, in front thereof, at any azimuth and offset relative to the rotational axis by the distance $r_0$, a respective temporally modulated second magnetic field, is generated.

15. A method for magnetic testing of samples, the method comprising:

a setup stage comprising providing a sample to be tested and a magnetic field generator configured to produce a temporally modulated magnetic field by rotating at least one magnet, which is permanent;

a data acquisition stage comprising for each of a plurality of temporal modulation amplitudes of the magnetic field and/or frequencies of the EM signals:

producing the magnetic field whereat the sample is positioned;

transmitting an EM signal into a waveguide positioned adjacently to the sample;

obtaining a measured signal by measuring a power of a transmitted portion of the EM signal over a time interval spanning multiple rotation cycles of the at least one magnet; and a data processing stage comprising:

demodulating each of the measured signals using a respective reference signal indicative of the modulation rate of the respective magnetic field; and processing the demodulated signals to obtain one or more sample parameters parameterizing one or more properties of the sample.

16. The method of claim 15, wherein the plurality of modulation amplitudes of the magnetic field, where at the sample is positioned, comprises a resonance modulation amplitude for which a coupling between a respective one of the EM signals and spins in the sample reaches resonance.

17. The method of claim 16, wherein in order to obtain the one or more sample parameters, for each of the frequencies of the EM signals, respective one or more spectral parameters, which characterize an absorption peak corresponding to the respective resonance, are extracted.

18. The method of claim 15, wherein the plurality of modulation amplitudes of the magnetic field, whereat the sample is positioned, is realized by varying a distance between the magnetic field generator and the sample.

19. The method of claim 15, wherein the sample comprises a thin film, which is exposed on the sample, and wherein the waveguide is positioned adjacently to the thin film.

20. The method of claim 19, wherein the magnetic field whereat the sample is positioned, at least when at about maximum strength, is parallel to the thin film, and wherein the data acquisition stage further comprises, implementing each of the substages for each of a plurality of amplitudes of an electric current, which simultaneously to the transmitting of the EM signal, is passed through the thin film.

* * * * *